United States Patent
Mukerji et al.

(10) Patent No.: US 11,431,744 B2
(45) Date of Patent: *Aug. 30, 2022

(54) DETECTION OF DENIAL OF SERVICE ATTACKS

(71) Applicant: ExtraHop Networks, Inc., Seattle, WA (US)

(72) Inventors: Arindum Mukerji, Seattle, WA (US); Khurram Waheed, Melbourne (AU)

(73) Assignee: ExtraHop Networks, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/813,649

(22) Filed: Mar. 9, 2020

(65) Prior Publication Data

US 2021/0037033 A1    Feb. 4, 2021

Related U.S. Application Data

(63) Continuation of application No. 16/391,216, filed on Apr. 22, 2019, now Pat. No. 10,587,638, which is a
(Continued)

(51) Int. Cl.
*H04L 9/30* (2006.01)
*H04L 9/40* (2022.01)

(52) U.S. Cl.
CPC ...... *H04L 63/1425* (2013.01); *H04L 63/1458* (2013.01); *H04L 2463/141* (2013.01)

(58) Field of Classification Search
CPC ............ H04L 63/1425; H04L 63/1458; H04L 2463/141
See application file for complete search history.

(56) References Cited

U.S. PATENT DOCUMENTS

| 5,027,269 A | 6/1991 | Grant et al. |
| 5,430,727 A | 7/1995 | Callon |

(Continued)

FOREIGN PATENT DOCUMENTS

| AU | 2008328833 A1 | 6/2009 |
| CN | 105071987 A | 11/2015 |

(Continued)

OTHER PUBLICATIONS

Beckett et al., "New sensing technique for detecting application layer DDoS attacks targeting back-end database resources", May 2017, IEEE International Conference on Communication, pp. 1-7 (Year: 2017).*

(Continued)

*Primary Examiner* — Kenneth W Chang
(74) *Attorney, Agent, or Firm* — John W. Branch; Branch Partners PLLC

(57) ABSTRACT

Embodiments are directed to monitoring network traffic over a network using one or more network monitoring computers. A monitoring engine may be instantiated to perform actions, including: monitoring network traffic to identify client requests provided by clients and server responses provided by servers in response to the client requests; determining request metrics associated with the client requests; and determining response metrics associated with the server responses. An analysis engine may be instantiated that performs actions, including: comparing the request metrics with the response metrics; determining atypical behavior associated with the clients based on the comparison such that the atypical behavior includes an absence of adaption by the clients to changes in the server responses; and providing alerts that may identify the clients be associated with the atypical behavior.

20 Claims, 12 Drawing Sheets

Related U.S. Application Data continuation of application No. 15/893,519, filed on Feb. 9, 2018, now Pat. No. 10,270,794.

(56) References Cited

U.S. PATENT DOCUMENTS

| | | |
|---|---|---|
| 5,541,995 A | 7/1996 | Normile et al. |
| 5,548,646 A | 8/1996 | Aziz et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,636,838 B1 | 10/2003 | Perlman et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen |
| 7,047,303 B2 | 5/2006 | Lingafeit et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,185,953 B2 | 5/2012 | Rothstein et al. |
| 8,194,542 B2 | 6/2012 | Väänänen et al. |
| 8,352,725 B1 | 1/2013 | O'Toole, Jr. |
| 8,402,540 B2 | 3/2013 | Kapoor et al. |
| 8,411,677 B1 | 4/2013 | Colloff |
| 8,418,249 B1 | 4/2013 | Nucci et al. |
| 8,443,190 B2 | 5/2013 | Breton et al. |
| 8,457,127 B2 | 6/2013 | Eastham et al. |
| 8,494,985 B1 | 7/2013 | Keralapura et al. |
| 8,533,254 B1 | 9/2013 | Whitson, Jr. et al. |
| 8,555,383 B1 | 10/2013 | Marshall et al. |
| 8,561,177 B1 | 10/2013 | Aziz et al. |
| 8,577,817 B1 | 11/2013 | Keralapura et al. |
| 8,578,024 B1 | 11/2013 | Keralapura et al. |
| 8,613,089 B1 * | 12/2013 | Holloway ........ H04L 63/1416 726/23 |
| 8,619,579 B1 | 12/2013 | Rothstein et al. |
| 8,627,422 B2 | 1/2014 | Hawkes et al. |
| 8,635,441 B2 | 1/2014 | Frenkel et al. |
| 8,699,357 B2 | 4/2014 | Deshpande et al. |
| 8,707,440 B2 | 4/2014 | Gula et al. |
| 8,744,894 B2 * | 6/2014 | Christiansen ........ G06Q 10/06 705/7.28 |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,959,643 B1 | 2/2015 | Invernizzi et al. |
| 8,964,548 B1 | 2/2015 | Keralapura et al. |
| 8,971,196 B2 | 3/2015 | Degioanni et al. |
| 9,026,467 B2 | 5/2015 | Bammi et al. |
| 9,036,493 B2 | 5/2015 | Degioanni et al. |
| 9,038,178 B1 | 5/2015 | Lin |
| 9,049,216 B2 | 6/2015 | McCanne et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,158,604 B1 | 10/2015 | Christodorescu et al. |
| 9,176,838 B2 | 11/2015 | Li et al. |
| 9,183,573 B2 | 11/2015 | Tseng |
| 9,189,318 B2 | 11/2015 | Li et al. |
| 9,191,400 B1 | 11/2015 | Ptasinski et al. |
| 9,203,865 B2 | 12/2015 | Linden et al. |
| 9,264,288 B1 | 2/2016 | Arora et al. |
| 9,338,147 B1 | 5/2016 | Rothstein et al. |
| 9,357,410 B2 | 5/2016 | Nedeltchev et al. |
| 9,369,479 B2 | 6/2016 | Lin |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |
| 9,430,646 B1 | 8/2016 | Mushtaq et al. |
| 9,432,430 B1 | 8/2016 | Klenz |
| 9,460,299 B2 | 10/2016 | Weiss et al. |
| 9,461,875 B2 | 10/2016 | Groat et al. |
| 9,479,405 B1 | 10/2016 | Tongaonkar et al. |
| 9,483,742 B1 | 11/2016 | Ahmed |
| 9,516,053 B1 | 12/2016 | Muddu |
| 9,531,736 B1 | 12/2016 | Torres et al. |
| 9,565,202 B1 | 2/2017 | Kindlund et al. |
| 9,565,203 B2 | 2/2017 | Bernstein et al. |
| 9,591,015 B1 | 3/2017 | Amin et al. |
| 9,621,523 B2 | 4/2017 | Rothstein et al. |
| 9,654,503 B1 | 5/2017 | Kowalyshyn |
| 9,660,879 B1 | 5/2017 | Rothstein et al. |
| 9,692,658 B2 | 6/2017 | Guo et al. |

(56) References Cited

U.S. PATENT DOCUMENTS

| | | |
|---|---|---|
| 9,715,820 B1 | 7/2017 | Boss et al. |
| 9,729,416 B1 | 8/2017 | Khanal et al. |
| 9,876,810 B2 | 1/2018 | McDougal et al. |
| 9,888,021 B2 | 2/2018 | Horesh et al. |
| 9,893,897 B2 | 2/2018 | Li et al. |
| 9,967,292 B1 | 5/2018 | Higgins et al. |
| 10,009,364 B2 | 6/2018 | Dasgupta et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,033,766 B2 | 7/2018 | Gupta et al. |
| 10,038,611 B1 | 7/2018 | Wu et al. |
| 10,050,982 B1 | 8/2018 | Guerra et al. |
| 10,063,434 B1 | 8/2018 | Khanal |
| 10,176,323 B2 | 1/2019 | Zhang et al. |
| 10,198,667 B2 | 2/2019 | Ryan, Jr. et al. |
| 10,204,211 B2 | 2/2019 | Hammerle et al. |
| 10,237,294 B1 | 3/2019 | Zadeh et al. |
| 10,263,883 B2 | 4/2019 | Kamble |
| 10,264,003 B1 | 4/2019 | Wu et al. |
| 10,277,618 B1 | 4/2019 | Wu et al. |
| 10,305,928 B2 | 5/2019 | McGrew et al. |
| 10,320,749 B2 | 6/2019 | Sengupta et al. |
| 10,321,344 B2 | 6/2019 | Barton et al. |
| 10,326,676 B1 | 6/2019 | Driggs et al. |
| 10,332,005 B1 | 6/2019 | Liao et al. |
| 10,348,767 B1 | 7/2019 | Lee et al. |
| 10,375,155 B1 | 8/2019 | Cai et al. |
| 10,380,498 B1 | 8/2019 | Chaoji et al. |
| 10,389,574 B1 | 8/2019 | Wu et al. |
| 10,411,978 B1 | 9/2019 | Ball et al. |
| 10,412,080 B1 | 9/2019 | Edwards et al. |
| 10,419,454 B2 | 9/2019 | El-Moussa et al. |
| 10,536,268 B2 | 1/2020 | Anderson et al. |
| 10,536,475 B1 | 1/2020 | McCorkle, Jr. et al. |
| 10,554,665 B1 | 2/2020 | Badawy et al. |
| 10,581,915 B2 | 3/2020 | Scherman et al. |
| 10,594,664 B2 | 3/2020 | Zaifman et al. |
| 10,594,718 B1 | 3/2020 | Deaguero et al. |
| 10,742,677 B1 | 8/2020 | Wu et al. |
| 10,778,700 B2 | 9/2020 | Azvine et al. |
| 10,805,338 B2 | 10/2020 | Kohout et al. |
| 10,841,194 B2 | 11/2020 | Kim |
| 10,992,693 B2 | 4/2021 | Luo et al. |
| 11,057,420 B2 | 7/2021 | McGrew et al. |
| 11,159,549 B2 | 10/2021 | El-Moussa et al. |
| 11,194,901 B2 | 12/2021 | El-Moussa et al. |
| 11,201,876 B2 | 12/2021 | Kallos et al. |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1 | 11/2002 | Hand et al. |
| 2002/0184362 A1* | 12/2002 | Banerjee ............ H04L 63/1458 709/224 |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafeit et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0156715 A1 | 8/2003 | Reeds, III et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Barai et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0050316 A1 | 3/2005 | Peles |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1* | 5/2005 | Jonathan Chao ... H04L 63/1458 370/235 |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita |
| 2005/0262237 A1 | 11/2005 | Fulton et al. |
| 2005/0270975 A1 | 12/2005 | Meylan et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |

(56) References Cited

U.S. PATENT DOCUMENTS

| | | |
|---|---|---|
| 2008/0059582 A1 | 3/2008 | Hartikanen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou |
| 2008/0147818 A1 | 6/2008 | Saoo |
| 2008/0162390 A1 | 7/2008 | Kapoor et al. |
| 2008/0172416 A1 | 7/2008 | Ito |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1* | 9/2008 | Martin ............... H04L 43/00 370/252 |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0122792 A1* | 5/2011 | Duffield ............ H04L 63/1425 370/252 |
| 2011/0126259 A1 | 5/2011 | Krishnamurthi et al. |
| 2011/0126275 A1 | 5/2011 | Anderson et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Tonsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0278477 A1 | 11/2012 | Terrell et al. |
| 2012/0278625 A1 | 11/2012 | Narayanan et al. |
| 2012/0278890 A1 | 11/2012 | Määttä et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0232104 A1 | 9/2013 | Goyal et al. |
| 2013/0262655 A1 | 10/2013 | Deschenes et al. |
| 2013/0291107 A1* | 10/2013 | Marek ............... G06F 21/552 726/22 |
| 2013/0305357 A1 | 11/2013 | Ayyagari et al. |
| 2013/0339514 A1 | 12/2013 | Crank et al. |
| 2013/0347018 A1 | 12/2013 | Limp et al. |
| 2014/0020067 A1 | 1/2014 | Kirn et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0189093 A1 | 7/2014 | du Toit et al. |
| 2014/0195797 A1 | 7/2014 | du Toit |
| 2014/0201838 A1 | 7/2014 | Varsanyi et al. |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Slotznick |
| 2014/0258511 A1 | 9/2014 | Sima et al. |
| 2014/0304211 A1 | 10/2014 | Horvitz |
| 2014/0310392 A1 | 10/2014 | Ho |
| 2014/0317288 A1 | 10/2014 | Krueger et al. |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1* | 1/2015 | Ben-Shalom ......... H04L 63/12 726/23 |
| 2015/0023168 A1 | 1/2015 | Kotecha et al. |
| 2015/0026027 A1* | 1/2015 | Priess ............... G06Q 20/4016 705/35 |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |

(56) References Cited

U.S. PATENT DOCUMENTS

| | | |
|---|---|---|
| 2015/0096022 A1 | 4/2015 | Vincent |
| 2015/0100780 A1 | 4/2015 | Rubin et al. |
| 2015/0106616 A1 | 4/2015 | Nix |
| 2015/0106930 A1 | 4/2015 | Honda |
| 2015/0113588 A1 | 4/2015 | Wing et al. |
| 2015/0121461 A1 | 4/2015 | Bulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0269358 A1 | 9/2015 | Hesketh et al. |
| 2015/0277802 A1 | 10/2015 | Oikarinen et al. |
| 2015/0304350 A1 | 10/2015 | Lin |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0026922 A1 | 1/2016 | Vasseur |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0119215 A1 | 4/2016 | Deschenes et al. |
| 2016/0127401 A1 | 5/2016 | Chauhan et al. |
| 2016/0134659 A1 | 5/2016 | Reddy |
| 2016/0142435 A1 | 5/2016 | Bernstein et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1 | 8/2016 | Sood et al. |
| 2016/0241574 A1 | 8/2016 | Kumar et al. |
| 2016/0262044 A1 | 9/2016 | Calin et al. |
| 2016/0285752 A1 | 9/2016 | Joshi |
| 2016/0294870 A1 | 10/2016 | Banjerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0352761 A1 | 12/2016 | McGrew et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0366186 A1 | 12/2016 | Kamble |
| 2016/0373414 A1 | 12/2016 | MacCarthaigh |
| 2016/0380885 A1 | 12/2016 | Jani et al. |
| 2017/0012836 A1 | 1/2017 | Tongaonkar et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0230270 A1 | 8/2017 | Padinhakara et al. |
| 2017/0230417 A1* | 8/2017 | Amar ............... H04L 63/20 |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0324758 A1 | 11/2017 | Hart et al. |
| 2017/0353437 A1 | 12/2017 | Ayyadevara et al. |
| 2017/0353477 A1 | 12/2017 | Faigon |
| 2017/0364794 A1 | 12/2017 | Mahkonen et al. |
| 2017/0366526 A1 | 12/2017 | Wood et al. |
| 2018/0007087 A1 | 1/2018 | Grady et al. |
| 2018/0013650 A1 | 1/2018 | Khanal et al. |
| 2018/0033089 A1* | 2/2018 | Goldman ............... G06Q 40/10 |
| 2018/0075240 A1 | 3/2018 | Chen |
| 2018/0084011 A1 | 3/2018 | Joseph et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |
| 2018/0109557 A1 | 4/2018 | Yoo et al. |
| 2018/0115566 A1 | 4/2018 | Azvine et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0351781 A1 | 12/2018 | Movsisyan et al. |
| 2018/0351970 A1 | 12/2018 | Majumder et al. |
| 2018/0375882 A1 | 12/2018 | Kallos et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |
| 2019/0012441 A1 | 1/2019 | Tuli et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |
| 2019/0079979 A1 | 3/2019 | Chan |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0132359 A1 | 5/2019 | Kraenzel |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0230095 A1 | 7/2019 | McGrew et al. |
| 2019/0236149 A1 | 8/2019 | Kuruvada et al. |
| 2019/0245734 A1 | 8/2019 | Wu et al. |
| 2019/0245763 A1 | 8/2019 | Wu et al. |
| 2019/0266999 A1 | 8/2019 | Chandrasekaran et al. |
| 2019/0303198 A1 | 10/2019 | Kim et al. |
| 2019/0372828 A1 | 12/2019 | Wu et al. |
| 2020/0034528 A1 | 1/2020 | Yang et al. |
| 2020/0067952 A1 | 2/2020 | Deaguero et al. |
| 2020/0099703 A1 | 3/2020 | Singh |
| 2020/0220849 A1 | 7/2020 | Zaifman et al. |
| 2020/0236131 A1 | 7/2020 | Vejman et al. |
| 2020/0287885 A1 | 9/2020 | Rodniansky |
| 2020/0389469 A1 | 12/2020 | Litichever et al. |
| 2021/0006589 A1 | 1/2021 | Kohout et al. |
| 2021/0185087 A1 | 6/2021 | Wu et al. |
| 2021/0250368 A1 | 8/2021 | Hearty et al. |

(56) References Cited

U.S. PATENT DOCUMENTS

| | | |
|---|---|---|
| 2021/0288993 A1 | 9/2021 | Kraning et al. |
| 2021/0360004 A1 | 11/2021 | McGrew et al. |
| 2021/0360011 A1 | 11/2021 | O'Hara et al. |

FOREIGN PATENT DOCUMENTS

| | | |
|---|---|---|
| CN | 106170008 A | 11/2016 |
| CN | 107646190 A | 1/2018 |
| CN | 107667510 A | 2/2018 |
| CN | 109104441 A | 12/2018 |
| CN | 109542772 A | 3/2019 |
| CN | 110113349 A | 8/2019 |
| CN | 107667510 B | 11/2020 |
| CN | 112085039 A | 12/2020 |
| CN | 112398876 A | 2/2021 |
| CN | 107646190 B | 3/2021 |
| DE | 69533953 T2 | 4/2006 |
| EP | 0702477 A2 | 3/1996 |
| EP | 0702477 A3 | 7/1999 |
| EP | 1026867 A | 8/2000 |
| EP | 0702477 B1 | 1/2005 |
| EP | 2057576 A2 | 5/2009 |
| EP | 2215801 B1 | 4/2011 |
| EP | 2057576 A4 | 4/2012 |
| EP | 3089424 A1 | 11/2016 |
| EP | 3113443 A1 | 1/2017 |
| EP | 3306890 A1 | 4/2018 |
| EP | 3394784 B1 | 10/2020 |
| EP | 3272095 B1 | 3/2021 |
| FR | 2924552 A1 | 6/2009 |
| GB | 2545910 A | 7/2017 |
| GB | 2545910 B | 2/2018 |
| KR | 960012819 A | 4/1996 |
| KR | 100388606 B1 | 11/2003 |
| KR | 1020140093060 A | 7/2014 |
| KR | 101662614 B1 | 10/2016 |
| NZ | 586270 A | 12/2011 |
| WO | 2008026212 A2 | 3/2008 |
| WO | 2008026212 A3 | 3/2008 |
| WO | 2009015461 A1 | 2/2009 |
| WO | 2009068603 A2 | 6/2009 |
| WO | 2015128613 A1 | 9/2015 |
| WO | 2016118131 A1 | 7/2016 |
| WO | 2016144932 A1 | 9/2016 |
| WO | 2016146610 A1 | 9/2016 |
| WO | 2016191486 A1 | 12/2016 |
| WO | 2017108575 A1 | 6/2017 |
| WO | 2017108576 A1 | 6/2017 |

OTHER PUBLICATIONS

Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/525,290 dated Mar. 12, 2020, pp. 1-11.
Office Communication for U.S. Appl. No. 15/971,843 dated Mar. 26, 2020, pp. 1-14.
Office Communication for U.S. Appl. No. 16/048,939 dated Mar. 26, 2020, pp. 1-6.
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.
Office Communication for U.S. Appl. No. 16/560,886 dated Apr. 22, 2020, pp. 1-10.
Office Communication for U.S. Appl. No. 16/565,109 dated May 8, 2020, pp. 1-19.
European Examination Report for European Patent Application No. 16166907.2 dated Dec. 19, 2019, pp. 1-6.
European Examination Report for European Patent Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for PCT/US2019/030015 dated Aug. 7, 2019, pp. 1-6.
International Search Report and Written Opinion for PCT/US2019/018097 dated May 28, 2019, pp. 1-9.
Official Communication for U.S. Appl. No. 15/671,060 dated May 8, 2019, pp. 1-18.
Official Communication for U.S. Appl. No. 16/113,422 dated Jun. 5, 2019, pp. 1-35.
Official Communication for U.S. Appl. No. 15/891,273 dated May 28, 2019, pp. 1-7.
Official Communication for U.S. Appl. No. 13/831,673 dated Sep. 30, 2013, pp. 1-17.
Official Communication for U.S. Appl. No. 13/831,673 dated Mar. 6, 2014, pp. 1-20.
Official Communication for U.S. Appl. No. 13/831,673 dated May 22, 2014, pp. 1-11.
Official Communication for U.S. Appl. No. 13/831,626 dated Sep. 3, 2013, pp. 1-32.
Official Communication for U.S. Appl. No. 13/831,959 dated Aug. 22, 2013, pp. 1-16.
Handel et al. (1996) Hiding data in the OSi network model. In: Anderson R. (eds) Information Hiding. IH 1996. Lecture Notes in Computer Science, vol. 1174. Springer, Berlin, Heidelberg.
Official Communication for U.S. Appl. No. 14/500,893 dated Nov. 20, 2014, pp. 1-23.
Official Communication for U.S. Appl. No. 14/107,580 dated Mar. 6, 2014, pp. 1-18.
Official Communication for U.S. Appl. No. 13/831,908 dated Aug. 9, 2013, pp. 1-42.
Official Communication for U.S. Appl. No. 13/831,908 dated Jan. 13, 2014, pp. 1-34.
Official Communication for U.S. Appl. No. 13/831,908 dated Apr. 9, 2014, pp. 1-4.
Official Communication for U.S. Appl. No. 13/831,908 dated Jun. 25, 2014, pp. 1-22.
Official Communication for U.S. Appl. No. 14/518,996 dated Nov. 20, 2014, pp. 1-51.
Official Communication for U.S. Appl. No. 14/107,631 dated Feb. 20, 2014, pp. 1-45.
Official Communication for U.S. Appl. No. 14/107,631 dated Sep. 26, 2014, pp. 1-28.
Official Communication for U.S. Appl. No. 14/107,631 dated Dec. 30, 2014, pp. 1-301.
Handley et al., "Network intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, "Evaluation of OSPF Extensions in MANET Routing," Paris, 2007, pp. 1-192.
Parsons, "Moving Across the Internet: Code-Bodies, Code-Corpses, and Network Architecture," May 9, 2010, pp. 1-20.
Zander et al., "Covert Channels and Countermeasures in Computer Network Protocols," Dec. 2007, pp. 1-7.
Official Communication for U.S. Appl. No. 14/107,580 dated Mar. 17, 2015, pp. 1-25.
Lin, Mark, "An Overview of Session Hijacking at the Network and Application Levels," Jan. 18, 2005, pp. 1-16.
U.S. Appl. No. 11/683,643, filed Mar. 8, 2007.
U.S. Appl. No. 11/679,356, filed Feb. 27, 2007.

(56) References Cited

OTHER PUBLICATIONS

Official Communication for U.S. Appl. No. 12/326,672 dated Jun. 9, 2010, pp. 1-14.
Official Communication for U.S. Appl. No. 12/326,672 dated Dec. 23, 2010, pp. 1-19.
Official Communication for U.S. Appl. No. 12/326,672 dated Jun. 22, 2011, pp. 1-31.
Official Communication for U.S. Appl. No. 12/326,672 dated Oct. 24, 2011, pp. 1-46.
Official Communication for U.S. Appl. No. 11/683,643 dated Apr. 28, 2010, pp. 1-44.
Official Communication for U.S. Appl. No. 11/683,643 dated Oct. 14, 2010, pp. 1-45.
Official Communication for U.S. Appl. No. 11/683,643 dated Aug. 25, 2011, pp. 1-54.
Official Communication for U.S. Appl. No. 11/683,643 dated Jan. 23, 2012, pp. 1-43.
Official Communication for U.S. Appl. No. 15/014,932 dated Jun. 10, 2016, pp. 1-46.
Official Communication for U.S. Appl. No. 15/207,213 dated Oct. 25, 2016, pp. 1-56.
Official Communication for U.S. Appl. No. 15/014,932 dated Dec. 14, 2016, pp. 1-513.
Digital imaging and Communications in Medicine (DICOM), Part 6: Data Dictionary, PS 3.6-2011. 2011, http://dicom.nema.org/Dicom/2011/11_06pu.pdf, pp. 1-255.
Health Level Seven, Version 2.6, Appendix A. Nov. 2007, https://www.hl7.org/special/committees/vocab/V26_Appendix_A.pdf, p. 1-216.
Official Communication for U.S. Appl. No. 15/207,213 dated Jun. 1, 2017, pp. 1-72.
Official Communication for U.S. Appl. No. 15/207,213 dated May 8, 2017, pp. 1-7.
Official Communication for U.S. Appl. No. 15/207,213 dated Feb. 23, 2017, pp. 1-24.
Official Communication for U.S. Appl. No. 15/014,932 dated Mar. 3, 2017, pp. 1-17.
Official Communication for U.S. Appl. No. 14/107,580 dated Sep. 15, 2014, pp. 1-22.
Official Communication for U.S. Appl. No. 15/014,932 dated Aug. 1, 2017, pp. 1-31.
Official Communication for U.S. Appl. No. 15/690,135 dated Jan. 18, 2018, pp. 1-23.
Official Communication for U.S. Appl. No. 15/891,311 dated Apr. 23, 2018, pp. 1-73.
Official Communication for U.S. Appl. No. 15/892,327 dated Apr. 23, 2018, pp. 1-54.
Office Communication for U.S. Appl. No. 15/014,932 dated May 15, 2018, pp. 1-32.
Office Communication for U.S. Appl. No. 15/891,273 dated Jun. 19, 2018, pp. 1-35.
Office Communication for U.S. Appl. No. 15/014,932 dated Jul. 16, 2018, pp. 1-17.
Office Communication for U.S. Appl. No. 15/690,135 dated May 22, 2018, pp. 1-16.
Office Communication for U.S. Appl. No. 15/984,197 dated Aug. 31, 2018, pp. 1-72.
Official Communication for U.S. Appl. No. 16/048,939 dated Sep. 19, 2018, pp. 1-40.
Official Communication for U.S. Appl. No. 15/891,311 dated Sep. 24, 2018, pp. 1-31.
Official Communication for U.S. Appl. No. 16/113,442 dated Nov. 6, 2018, pp. 1-56.
Official Communication for U.S. Appl. No. 15/014,932 dated Nov. 23, 2018, pp. 1-50.
Official Communication for U.S. Appl. No. 16/100,116 dated Nov. 15, 2018, pp. 1-54.
Official Communication for U.S. Appl. No. 15/891,273 dated Jan. 15, 2019, pp. 1-47.
Official Communication for U.S. Appl. No. 15/891,311 dated Jan. 29, 2019, pp. 1-30.
Official Communication for U.S. Appl. No. 16/174,051 dated Jan. 29, 2019, pp. 1-96.
Official Communication for U.S. Appl. No. 16/107,509 dated Oct. 26, 2018, pp. 1-44.
Official Communication for U.S. Appl. No. 16/107,509 dated Apr. 1, 2019, pp. 1-72.
Official Communication for U.S. Appl. No. 16/048,939 dated Jun. 20, 2019, pp. 1-14.
Official Communication for U.S. Appl. No. 16/100,116 dated May 30, 2019, pp. 1-23.
Official Communication for U.S. Appl. No. 16/107,509 dated Jun. 14, 2019, pp. 1-6.
Official Communication for U.S. Appl. No. 16/384,574 dated May 31, 2019, pp. 1-44.
Official Communication for U.S. Appl. No. 16/107,509 dated Aug. 21, 2019, pp. 1-54.
Office Communication for U.S. Appl. No. 16/384,574 dated Oct. 8, 2019, pp. 1-60.
Office Communication for U.S. Appl. No. 16/543,243 dated Sep. 27, 2019, pp. 1-45.
Office Communication for U.S. Appl. No. 16/048,939 dated Dec. 5, 2019, pp. 1-15.
Office Communication for U.S. Appl. No. 16/565,109 dated Nov. 27, 2019, pp. 1-31.
Office Communication for U.S. Appl. No. 16/525,290 dated Oct. 31, 2019, pp. 1-17.
Office Communication for U.S. Appl. No. 16/532,275 dated Oct. 24, 2019, pp. 1-42.
Office Communication for U.S. Appl. No. 16/560,886 dated Dec. 6, 2019, pp. 1-45.
Office Communication for U.S. Appl. No. 14/500,893 dated Feb. 18, 2015, pp. 1-13.
Office Communication for U.S. Appl. No. 14/695,690 dated Feb. 24, 2016, pp. 1-32.
Office Communication for U.S. Appl. No. 15/150,354 dated Jul. 5, 2016, pp. 1-28.
Mozilla Developer Network, "NSS Key Log Format," https://developer.mozilla.org/en-US/docs/Mozilla/Projects/NSS/Key_Log_Format, Jan. 8, 2010, p. 1-1.
European Search Report for European Application No. 16166907.2 dated Sep. 14, 2016, pp. 1-7.
Office Communication for U.S. Appl. No. 15/150,354 dated Feb. 8, 2017, pp. 1-18.
Office Communication for U.S. Appl. No. 15/466,248 dated Jun. 5, 2017, pp. 1-90.
Office Communication for U.S. Appl. No. 15/466,248 dated Oct. 3, 2017, pp. 1-91.
Office Communication for U.S. Appl. No. 15/457,886 dated Jan. 5, 2018, pp. 1-20.
Office Communication for U.S. Appl. No. 15/466,248 dated Jan. 11, 2018, pp. 1-4.
European Exam Report for European Application No. 16166907.2 dated Mar. 9, 2018, pp. 1-4.
Shever, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Office Communication for U.S. Appl. No. 15/466,248 dated Mar. 8, 2018, pp. 1-108.
Office Communication for U.S. Appl. No. 15/457,886 dated Jul. 18, 2018, pp. 1-23.
Office Communication for U.S. Appl. No. 15/466,248 dated Jul. 11, 2018, pp. 1-299.
International Search Report and Written Opinion for PCT/US2017/068585 dated Jul. 4, 2018, pp. 1-9.
European Search Report for European Application No. 17210995.1 dated Jul. 6, 2018, pp. 1-11.
Office Communication for U.S. Appl. No. 15/466,248 dated Oct. 18, 2018, pp. 1-303.
Office Communication for U.S. Appl. No. 15/457,886 dated Mar. 20, 2019, pp. 1-22.
Office Communication for U.S. Appl. No. 15/466,248 dated May 16, 2019, pp. 1-304.

(56) References Cited

OTHER PUBLICATIONS

Office Communication for U.S. Appl. No. 15/466,248 dated Sep. 10, 2019, pp. 1-39.
Office Communication for U.S. Appl. No. 15/971,843 dated Oct. 22, 2019, pp. 1-31.
Office Communication for U.S. Appl. No. 14/750,905 dated Sep. 22, 2015, pp. 1-18.
Office Communication for U.S. Appl. No. 14/750,905 dated Jan. 19, 2016, pp. 1-16.
Office Communication for U.S. Appl. No. 15/082,925 dated Sep. 13, 2016, pp. 1-8.
Office Communication for U.S. Appl. No. 15/289,760 dated Dec. 12, 2016, pp. 1-21.
Office Communication for U.S. Appl. No. 15/219,016 dated Nov. 22, 2016, pp. 1-13.
Office Communication for U.S. Appl. No. 15/356,381 dated Jan. 6, 2017, pp. 1-66.
Office Communication for U.S. Appl. No. 15/082,925 dated Feb. 1, 2017, pp. 1-16.
Office Communication for U.S. Appl. No. 15/219,016 dated Mar. 16, 2017, pp. 1-13.
Office Communication for U.S. Appl. No. 15/443,868 dated Apr. 27, 2017, pp. 1-14.
Office Communication for U.S. Appl. No. 15/585,887 dated Jun. 27, 2017, pp. 1-54.
Office Communication for U.S. Appl. No. 15/356,381 dated Jul. 3, 2017, pp. 1-49.
Office Communication for U.S. Appl. No. 15/675,216 dated Jun. 7, 2018, pp. 1-5.
Office Communication for U.S. Appl. No. 15/443,868 dated Aug. 11, 2017, pp. 1-21.
Office Communication for U.S. Appl. No. 15/675,216 dated Nov. 20, 2017, pp. 1-10.
Office Communication for U.S. Appl. No. 15/585,887 dated Nov. 28, 2017, pp. 1-29.
International Search Report and Written Opinion for PCT/US2018/030145 dated Aug. 10, 2018, pp. 1-12.
Svoboda, "Network Traffic Analysis with Deep Packet Inspection Method," Fac. Informatics Masaryk Univ., No. Master's Thesis, 2014, pp. 1-148.
International Search Report and Written Opinion for PCT/US2017/068585 dated Jul. 4, 2018, pp. 1-11.
European Search Report for European Application No. 17210995 dated Jun. 28, 2018, pp. 1-11.
Office Communication for U.S. Appl. No. 15/855,769 dated Feb. 5, 2019, pp. 1-21.
Office Communication for U.S. Appl. No. 15/855,769 dated May 1, 2019, pp. 1-20.
Office Communication for U.S. Appl. No. 16/459,472 dated Aug. 14, 2019, pp. 1-24.
Office Communication for U.S. Appl. No. 15/585,887 dated Mar. 20, 2019, pp. 1-35.
Office Communication for U.S. Appl. No. 15/675,216 dated Aug. 28, 2018, pp. 1-21.
Office Communication for U.S. Appl. No. 15/675,216 dated Jan. 29, 2019, pp. 1-18.
Office Communication for U.S. Appl. No. 16/384,697 dated May 30, 2019, pp. 1-17.
Office Communication for U.S. Appl. No. 16/384,574 dated Jan. 13, 2020, pp. 1-23.
Office Communication for U.S. Appl. No. 16/107,509 dated Jan. 23, 2020, pp. 1-39.
Office Communication for U.S. Appl. No. 15/585,887 dated Jan. 22, 2020, pp. 1-34.
Office Communication for U.S. Appl. No. 16/384,697 dated Oct. 17, 2019, pp. 1-33.
Official Communication for U.S. Appl. No. 16/459,472 dated Feb. 3, 2020, pp. 1-18.
Official Communication for U.S. Appl. No. 16/679,055 dated Feb. 14, 2020, pp. 1-32.
Official Communication for U.S. Appl. No. 16/048,939 dated Feb. 18, 2020, pp. 1-6.
Official Communication for U.S. Appl. No. 16/424,387 dated Feb. 24, 2020, pp. 1-15.
Official Communication for U.S. Appl. No. 16/718,050 dated Feb. 27, 2020, pp. 1-22.
Wade, Susan Marie, "SCADA Honeynets: The attractiveness of honeypots as critical infrastructure security tools for the detection and analysis of advanced threats" (2011). Graduate Theses and Dissertations. 12138. https://lib.dr.iastate.edu/etd/12138, pp. 1-67.
Office Communication for U.S. Appl. No. 16/525,290 dated Jun. 15, 2021, pp. 1-4.
Examination Report for European Patent Application No. 17210996.9 dated May 21, 2021, pp. 1-6.
Office Communication for U.S. Appl. No. 16/525,290 dated Jul. 9, 2021, pp. 1-7.
Office Communication for U.S. Appl. No. 16/679,055 dated Jul. 26, 2021, pp. 1-34.
Office Communication for U.S. Appl. No. 16/718,050 dated Jul. 27, 2021, pp. 1-23.
Office Communication for U.S. Appl. No. 15/585,887 dated Jul. 28, 2021, pp. 1-9.
Office Communication for U.S. Appl. No. 15/585,887 dated Aug. 17, 2021, pp. 1-41.
Office Communication for U.S. Appl. No. 16/679,055 dated Mar. 16, 2021, pp. 1-33.
Office Communication for U.S. Appl. No. 15/585,887 dated Mar. 26, 2021, pp. 1-31.
Office Communication for U.S. Appl. No. 16/525,290 dated Mar. 31, 2021, pp. 1-11.
Office Communication for U.S. Appl. No. 15/971,843 dated May 5, 2021, pp. 1-9.
Office Communication for U.S. Appl. No. 16/820,582 dated May 10, 2021, pp. 1-24.
Office Communication for U.S. Appl. No. 16/820,582 dated Sep. 27, 2021, pp. 1-25.
Office Communication for U.S. Appl. No. 16/679,055 dated Oct. 12, 2021, pp. 1-3.
Office Communication for U.S. Appl. No. 17/351,866 dated Oct. 18, 2021, pp. 1-12.
Office Communication for U.S. Appl. No. 17/337,299 dated Oct. 21, 2021, pp. 1-34.
Office Communication for U.S. Appl. No. 15/585,887 dated Nov. 2, 2021, pp. 1-4.
Office Communication for U.S. Appl. No. 16/679,055 dated Nov. 12, 2021, pp. 1-34.
Office Communication for U.S. Appl. No. 17/483,435 dated Nov. 30, 2021, pp. 1-21.
Office Communication for U.S. Appl. No. 17/483,148 dated Dec. 13, 2021, pp. 1-28.
Office Communication for U.S. Appl. No. 17/226,947 dated Dec. 30, 2021, pp. 1-6.
Office Communication for U.S. Appl. No. 16/820,582 dated Jan. 14, 2022, pp. 1-13.
Office Communication for U.S. Appl. No. 16/989,025 dated Jan. 19, 2022, pp. 1-12.
Supplementary European Search Report for European Patent Application No. 19804040.4 dated Jan. 25, 2022, pp. 1-4.
Office Communication for U.S. Appl. No. 17/351,866 dated Feb. 9, 2022, pp. 1-9.
International Search Report and Written Opinion for International Patent Application No. PCT/US2021/051757 dated Jan. 11, 2022, pp. 1-9.
"Kerberos Overview—An Authentication Service for Open Network Systems," Cisco Systems, Inc., Jan. 19, 2006, https://www.cisco.com/c/en/US/support/docs/security-vpn/kerberos/16087-1.html, Accessed: Feb. 9, 2022, pp. 1-16.
Office Communication for U.S. Appl. No. 17/337,299 dated Feb. 17, 2022, pp. 1-14.
Office Communication for U.S. Appl. No. 16/679,055 dated Mar. 2, 2022, pp. 1-35.
Office Communication for U.S. Appl. No. 15/585,887 dated Mar. 24, 2022, pp. 1-40.

(56) References Cited

OTHER PUBLICATIONS

Office Communication for U.S. Appl. No. 16/989,343 dated Mar. 29, 2022, pp. 1-21.
Office Communication for U.S. Appl. No. 16/989,343 dated Mar. 29, 2022, pp. 1-5.
Extended European Search Report for European Patent Application No. 19846527.0 dated Apr. 4, 2022, pp. 1-9.
Conry-Murray, Andrew, "Security Event Management Gets Specialized,"Network Magazine, CMP Media, vol. 20, Nov. 2005, pp. 1-6.

* cited by examiner

DETECTION OF DENIAL OF SERVICE ATTACKS

CROSS-REFERENCE TO RELATED APPLICATION(S)

This Utility Patent Application is a Continuation of U.S. patent application Ser. No. 16/391,216 filed on Apr. 22, 2019, now U.S. Pat. No. 10,587,638 issued on Mar. 10, 2020, which is a Continuation of U.S. patent application Ser. No. 15/893,519 filed on Feb. 9, 2018, now U.S. Pat. No. 10,270,794 issued on Apr. 23, 2019, the benefit of which is claimed under 35 U.S.C. § 120, and the contents of which are each further incorporated in entirety by reference.

TECHNICAL FIELD

The present invention relates generally to network monitoring, and more particularly, but not exclusively, to detecting denial of service attacks in a distributed network monitoring environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor. Further, some networks may be attacked using various denial of service attacks or distributed denial of service attacks (DDOSs) that attempt to exhaust resources in an effort to deny the service of legitimate requests. The growing complexity or sophistication of such attacks may reduce the efficacy of conventional defenses to identify or mitigate DDOS attacks. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
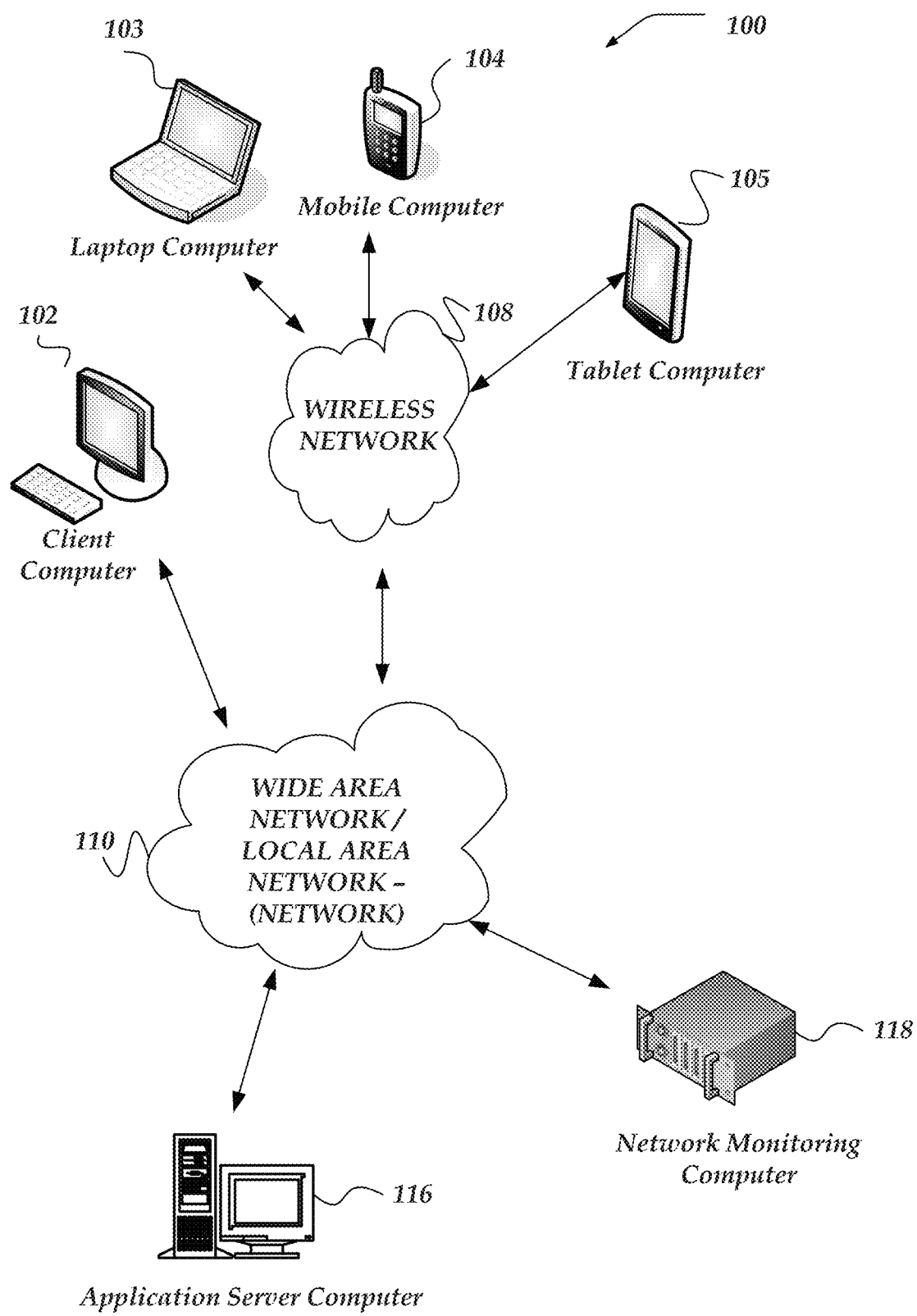
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, RTSP, Voice Over IP (VOIP), custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In one or more of the various embodiments, NMCs and/or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and frames. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end-to-end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end-user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the "device profile" refers to a data structure that represents the characteristics of network devices that are discovered in networks monitored by NMCs. Values or fields in device profiles may be based on metrics, network traffic characteristics, network footprints, or the like, that have been collected based on passive network monitoring of network traffic in one or more monitored networks. Device profiles may be provided for various network devices, such as, client computers, server computers, application server computers, networked storage devices, routers, switches, firewalls, virtual machines, container instances (e.g., containerized services), cloud instances, or the like.

As used herein, the "application profile" refers to a data structure that represents the characteristics of applications or services that are discovered in networks monitored by NMCs. Values or fields in application profiles may be based on metrics, network traffic characteristics, network footprints, or the like, that have been collected based on passive network monitoring of network traffic in one or more monitored networks. Application profiles may be provided for various applications, such as, client computers, server computers, application server computers, networked storage devices, routers, switches, firewalls, virtual machines, container instances (e.g., containerized services), cloud instances, or the like. For example, application profiles may be provided for web clients, web servers, database clients, database servers, credentialing services, mobile application clients, payment processors, groupware clients, groupware services, micro-services, container based services, document management clients, document management services, billing/invoicing systems, building management services, healthcare management services, VOIP clients, VOIP servers, or the like.

As used herein, the term "entity profile" refers to a data structure that represent the characteristics of a network entity that may be a combination of device profiles and application profiles. Entity profiles may also include additional values or fields based on metrics, network traffic characteristics, network footprint, or the like, that have been collected based on passive network monitoring of network traffic in one or more monitored networks. For example, an entity profile may be provided for application servers where the entity profile is made from some or all of the device profile of the computer running or hosting the applications and some or all of the application profiles associated with the applications or services that are running or hosting one the computer. In some cases, multiple services or applications running on devices may be included in the same entity profile. In other cases, entity profiles may be arranged in hierarchal data structure similar to an object oriented computer languages class hierarchy.

As used herein, the term "observation port" refers to network taps, wireless receivers, port mirrors or directed tunnels from network switches, clients or servers, virtual machines, container instances (e.g., containerized services), cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the terms "denial of service (DOS)", "distributed denial of service (DDOS)" refer to malicious cyberattacks that attempt to deny, disrupt, or otherwise interfere with a server or a service to negatively impacts its ability to provide service to legitimate clients. DOS attackers generally attack services by sending a high volume of requests over a network that consume sufficient resources of target such that the target cannot service legitimate requests because it is trying to service the many bogus or fraudulent requests provided by the attackers. DOS attacks may comprise a flood of network traffic that poses or disguised as legitimate traffic. For example, where the volumetric attacks consume bandwidth of the target, or bandwidth to the network path of the target. Also, another type of DDOS attacks (e.g., TCP State-exhaustion attacks) may be designed to exhaust the connection state tables of infrastructure components like routers/switches/load-balancers or the target server. Further, there are the 'low and slow' or L7 application layer DDOS attacks, which impact some aspect of the target service or application at Layer 7. Note, DOS or DDOS may be used interchangeably to represent denial of service attacks or distributed denial of service attacks.

As used herein the term "client request" refers to any network communication sent from a computer, application, service, or device to another computer, application, service, or device. A computer may be considered a client if or when it sends client requests.

As used herein the term "server response" refers to any network communication sent from a computer, application, service, or device to another computer, application, service, or device in response to a client request. A computer may be considered a server if or when it sends server responses. Note, the same computer, application, service, or device may be considered a client if or when it sends client requests and then it may be considered a server if or when it sends server responses.

As used herein the term "transaction rate" refers to a metric that represents a composite value comprising one or more of send rate, rate of receipt, dwell time (time between request and response), response transmission time, or the like, or combination thereof. NMCs may be arranged to collect metrics associated with the various transaction rate components as well as provide a composite metric that represents an overall transaction rate for a network flow, connection, client, server, service, application, session, or the like. Further, NMC configuration information or rule-based policies may be arranged to enable one or more users, administrators, or operators, to set values, weight coefficients, thresholds, or the like, based on their preferences. For example, an organization may configure transaction rate to be exclusively computed based on send rate. Alternatively, for example, an organization may provide a formula such as Transaction Rate=(C1*Send Rate+C2*Dwell Time+ . . . +Cn*X)/N where the transaction rate is composed of one or more weighted metrics and normalized to a desired range. Also, in some embodiments, rather than using a continuous value range, transaction rate may be represented using category buckets, such as, HIGH, NORMAL, LOW, or the like. The particular buckets and the value ranges associated with them may be defined in configuration information, rule-based policies, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic over a network using one or more network monitoring computers (NMCs) to perform actions described below. In one or more of the various embodiments, a monitoring engine may be instantiated to perform actions, including: monitoring network traffic to identify one or more client requests that may be provided by one or more clients and one or more server responses that may be provided by one or more servers in response to the one or more client requests; determining one or more request metrics that may be associated with the one or more client requests; and determining one or more response metrics that may be associated with the one or more server responses.

In one or more of the various embodiments, an analysis engine may be instantiated that performs actions, including: comparing the one or more request metrics with the one or more response metrics; determining atypical behavior that may be associated with the one or more clients based on the comparison such that the atypical behavior may include an absence of adaption by the one or more clients to one or more changes in the one or more server responses; and providing one or more alerts that may identify the one or more clients that may be associated with the atypical behavior.

In one or more of the various embodiments, the comparison of the one or more request metrics and the one or more response metrics, may include: comparing one or more transaction rates that may be associated with the one or more clients and the one or more servers to one or more client request send rates; and determining the one or more atypical behavior clients based on the comparison such that the one or more client request send rates associated with the one or more atypical behavior clients may increase or may remain constant as the one or more transaction rates decrease.

In one or more of the various embodiments, the analysis engine may be arranged to perform further actions, including: comparing the one or more client requests to one or more expected client requests that may be based on an application provided by the one or more servers; and determining the one or more atypical behavior clients based on the comparison such that the one or more atypical behavior clients may send one or more of the one or more client requests that include atypical communications.

In one or more of the various embodiments, the analysis engine may be arranged to perform further actions, including: correlating the one or more client requests with the one or more server responses based on one or more characteristics of the one or more client requests and the one or more server responses; comparing the one or more correlated client requests with the one or more correlated server responses; and determining the one or more atypical behavior clients based on a result of the correlated comparison.

In one or more of the various embodiments, the analysis engine may be arranged to perform further actions, including: assigning a weight value to the one or more client requests based on a payload size or a performance load that may be associated with the one or more server responses; and determining the one or more atypical behavior clients based on the one or more weighted client requests such that the one or more atypical behavior clients send the one or more client requests that are weighted more than the one or more weighted client requests associated with one or more other clients that perform typical behavior.

In one or more of the various embodiments, the analysis engine may be arranged to perform further actions, including, modifying one or more network characteristics of the one or more server responses to the one or more clients such that the modification may increase an apparent latency or transaction rate of the one or more servers to reduce the rate of the one or more server responses.

In one or more of the various embodiments, the monitoring engine may be arranged to perform further actions, including: monitoring network traffic that may occur inside a trusted network; and collecting the one or more request metrics and the one or more response metrics based on the network traffic that occurs inside the trusted network.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), Worldwide Interoperability for Microwave Access (WiMAX), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), Passive Optical Networks (PON), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations and/or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Likewise, in one or more of the various embodiments, application server computer 116, or network monitoring computer 118 may be implemented using one or more containers in one or more container computing environments. Accordingly, these innovations and embodiments are not to be construed as being limited to a single environment, and other configurations, and other architectures are also envisaged.

Illustrative Client Computer

Figure 2:
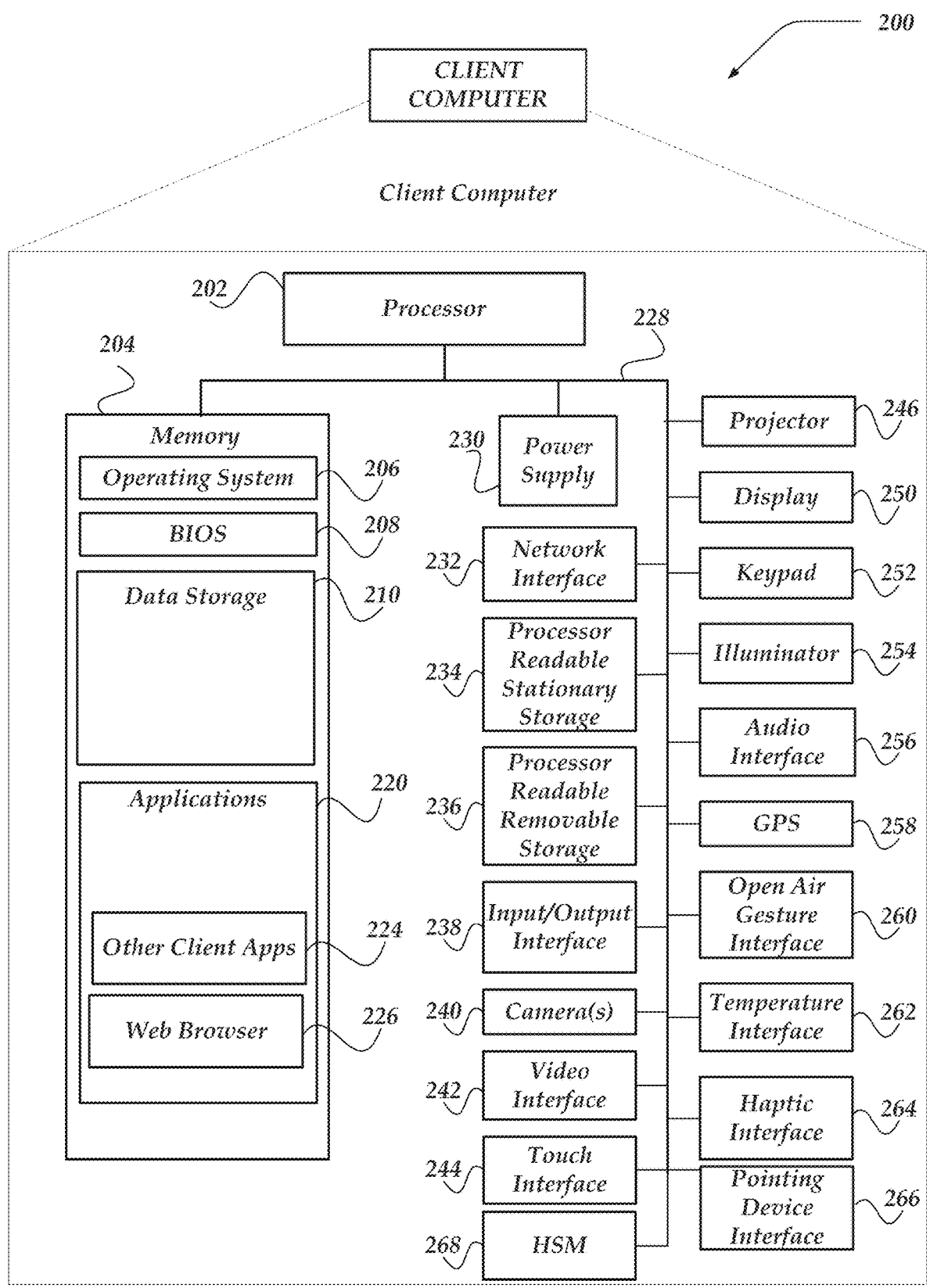
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
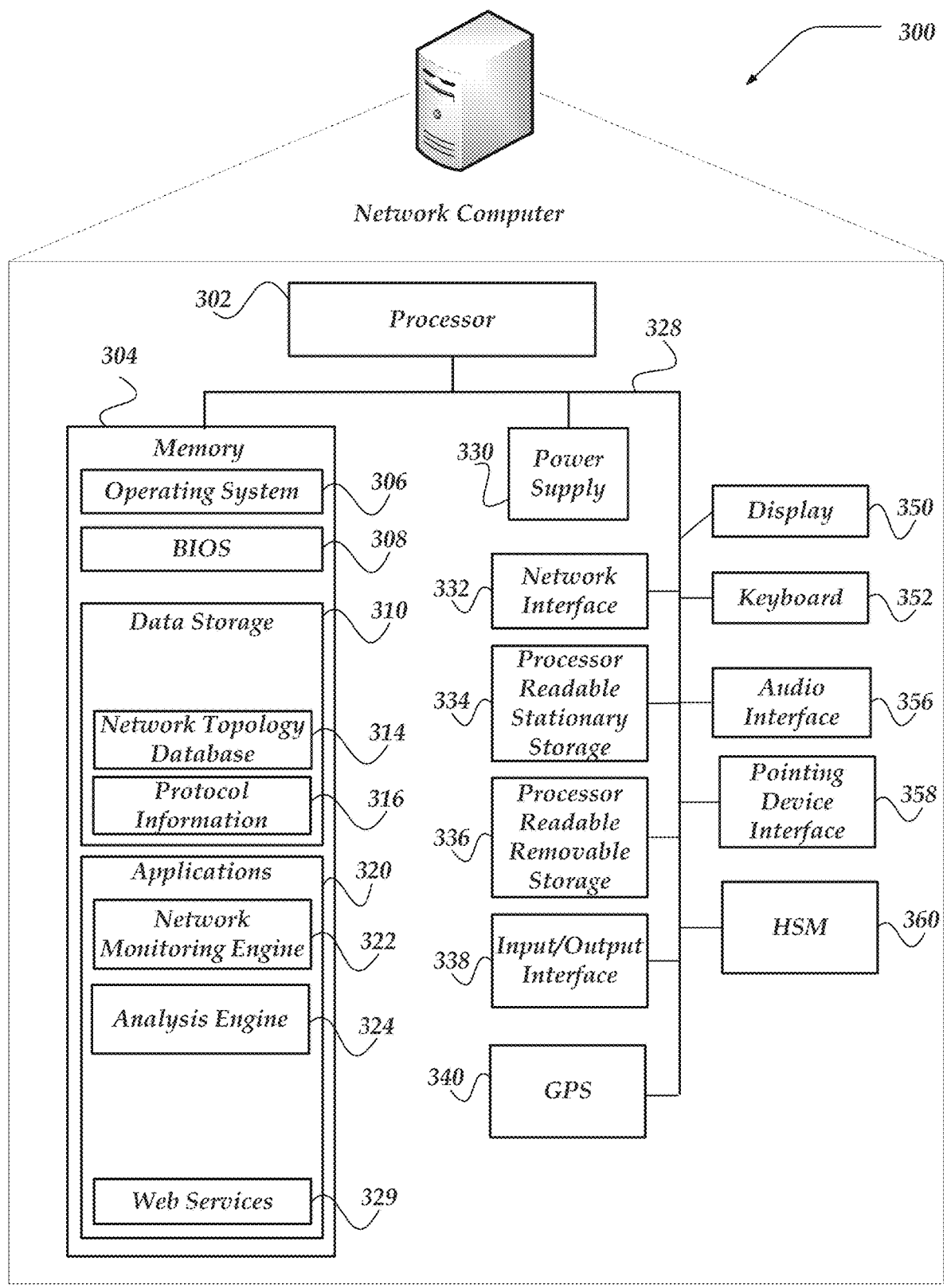
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, analysis engine 324, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes and/or databases. In at least one of the various embodiments, geo-location information used for selecting localization information may be provided by GPS 340. Also, in some embodiments, geolocation information may include information provided using one or more geolocation protocols over the networks, such as, wireless network 108 and/or network 111.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, or the like. Network topology database 314 may be a data store that contains information related to the topology of one or more network monitored by a NMC. And, protocol information 316 may store various rules and/or configuration information related to one or more network communication protocols, including application protocols, secure communication protocols, client-server protocols, peer-to-peer protocols, shared file system protocols, or the like, that may be employed in a monitored network environment.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, analysis engine 324, web services 329, or the like, that may be arranged to perform actions for embodiments described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, network monitoring engine 322, analysis engine 324, web services 329, or the like, may be operative in a cloud-based computing environment. In one or more of the various embodiments, these applications, and others, that comprise the management platform may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment.

Likewise, in one or more of the various embodiments, network monitoring engine 322, analysis engine 324, web services 329, or the like, may be operative in a container-based computing environment. In one or more of the various embodiments, these applications, and others, that comprise the network monitoring computer may be containerized or otherwise executing within containers that may be managed in a container based computing environment. In one or more of the various embodiments, in this context the applications may flow from one physical network computer within the container-based environment to another depending on performance and scaling considerations automatically managed by the container computing environment.

Accordingly, in one or more of the various embodiments, virtual machines and/or virtual servers dedicated to network monitoring engine 322, analysis engine 324, web services 329, or the like, may be provisioned and de-commissioned automatically.

Also, in one or more of the various embodiments, network monitoring engine 322, analysis engine 324 web services 329, or the like, or the like, may be located in virtual servers running in a cloud-based computing environment or containers in containerized computing environments rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
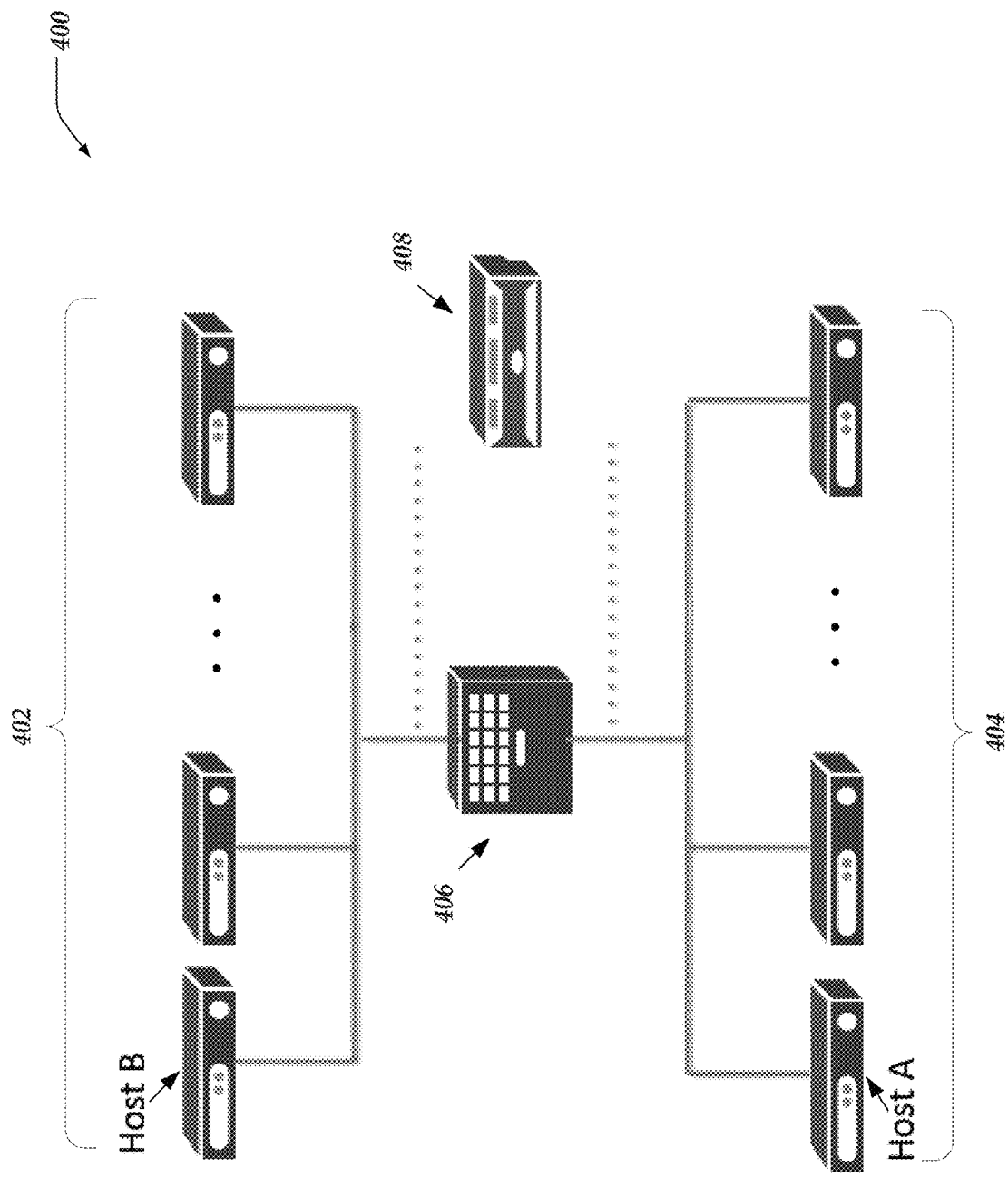
FIG. 4 illustrates a logical architecture of a system for detection of denial of service attacks in accordance with one or more of the various embodiments.

FIG. 4 illustrates a logical architecture of system 400 for detection of denial of service attacks in accordance with one or more of the various embodiments. System 400 may be arranged to include a plurality of network devices and/or network computers on first network 402 and a plurality of network devices and/or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machines, containers (e.g., containerized services), cloud computing instances, other network infrastructure devices, or the like, or combination thereof. In at least some of the various embodiments, the NMC may receive a copy of each packet on a particular network segment or virtual local area network (VLAN).

Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In one or more of the various embodiments, wire traffic from one or more networks may be provided to an NMC via one or more SPAN aggregators that are arranged to provide mirrored to separate input ports corresponding to different physical or logical portions of one or more networks. In other embodiments, mirrored wire traffic from one or more monitored networks may be provided to the NMC over a single port. In general, NMCs may be arranged to receive mirrored network traffic (e.g., wire traffic) from more than one location in the monitored networks. Accordingly, in one or more of the various embodiments, each of these locations may be considered an observation port.

In one or more of the various embodiments, different or separate observation ports may provide network traffic from different parts of the monitored networks. Accordingly, NMCs may be arranged to monitor internal network traffic or network traffic that originates from outside the network.

In one or more of the various embodiments, monitored network transactions may be mapped to transport protocols, application protocols, or the like. Accordingly, in some embodiments, NMCs may be arranged to monitor whether endpoints (e.g., clients or servers) are faithfully honoring the application protocols being used.

Figure 5:
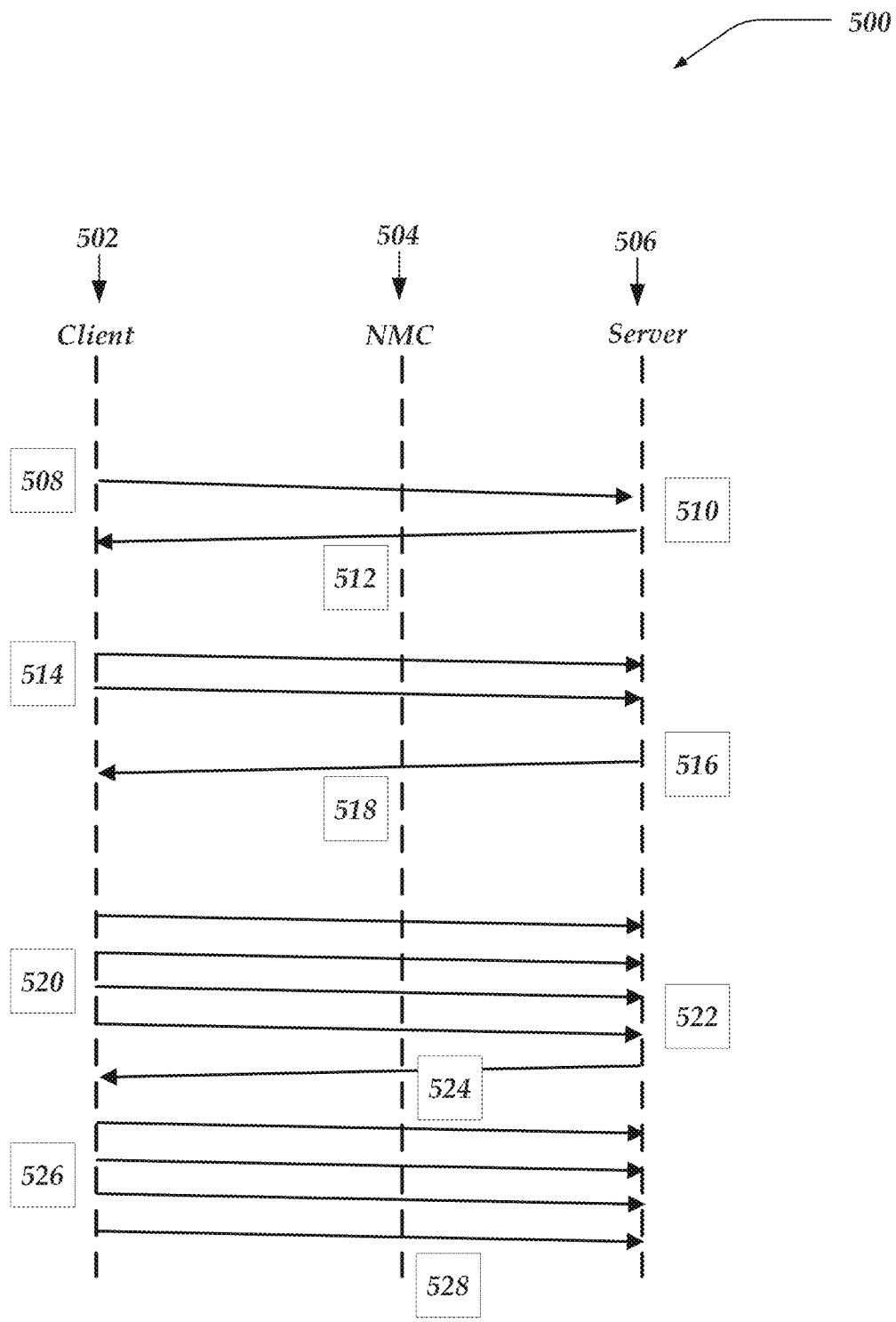
FIG. 5 is an illustration of a sequence of network traffic that may be monitored in accordance with one or more of the various embodiments.

FIG. 5 is an illustration of sequence 500 of network traffic that may be monitored in accordance with one or more of the various embodiments. Sequence 500 illustrates some non-limiting examples that will be used to describe how the denial of service attacks may be detected in accordance with one or more of the various embodiments. In this example, client 502 may be communicating with server 506 with NMC 504 disposed to passively monitor the network traffic comprising their communication. In this example, NMC 504 may be arranged to monitor the network traffic sent between client 502 and server 504. This traffic may be analyzed in various ways to detect DOS/DDOS) attacks.

At step 508, in one or more of the various embodiments, client 502 may send a request that is directed to server 506. At step 510, server 506 may receive the request and provide a response that is directed to client 508. At step 512, the NMC may be arranged to evaluate the request-response pair to determine it the behavior of the client or server falls within acceptable parameters. Note, as described above, NMC 504 may be arranged to monitor both directions of the network traffic. Also, in one or more of the various embodiments, NMC 504 may be arranged to maintain state information associated with the network flows or network connections. This enables NMCs to associated metrics, heuristic results, rules, or the like, with particular network flows, connections, or sessions. In this example, the response from server 506 may be correlated or mapped to the request made by client 502. Accordingly, in some embodiment, this behavior may be considered normal or of no concern.

At step 514, in this example, for some embodiments, client 502 sends two requests directed to server 506. At step 516, server 506 responds with a single response. At step 518, NMC 504 may be arranged to analyze to network traffic to determine if it may be related to a DOS attack. In this example, there are two requests but only one response. In some cases, this may be normal behavior depending on the communication protocols being used. In other cases, it may be abnormal. Likewise, in some embodiments, NMC 504 may require additional information before concluding that the traffic is safe or malicious. The additional information may require deep packet inspection, further observation, or the like. But for this example, the traffic may be suspicious but not that out of the ordinary.

At step 520, in this example, client 502 is sending four requests in rapid succession. At step 522, server 506 has received the four requests and sends a single response. At step 524, NMC 504 may be arranged to analyze the traffic between client 502 and server 506. In some embodiments, NMC 504 may discover that while server 506 has received four requests it was only able to respond to one request, and more importantly in this example, client 502 sent three more requests without waiting for a response to the first request. In some embodiments, this may indicate that client 502 may not be interested in the response. Accordingly, in this example, such behavior may show that client 503 may be a bad actor that is participating in a DOS attack directed at server 560.

At step 526, client 502 is continuing to flood server 506 with requests without waiting for responses or slowing down its transmit rate. At step 528, in this example, NMC 504 may observe that client 502 has not reduced its transaction rate, so it may be a DOS attacker.

Sequence 500 includes a few examples that illustrates how interactions between clients and servers may be monitored to identify conditions that may indicate of a DOS attack.

In one or more of the various embodiments, NMCs may be arranged to monitor or observe both sides of a network communication. Accordingly, in one or more of the various embodiments, NMCs may correlate requests with responses and measure timing metrics related to the communication.

In one or more of the various embodiments, in normal (e.g., non-malicious) circumstances, as load increases on a server the response time of a server to a given request may increase. Accordingly, depending on the application or protocols involved, clients may be expected to back-off or slow down their request rate in response to a server slowing. Generally, this may occur because clients may be waiting for a response before sending another request. Likewise, if servers become too busy to respond to requests and begin dropping or ignoring requests from clients, non-malicious clients may tend to automatically resend the dropped requests and reduce their transaction rate to adapt to the slowing server.

Thus, in one or more of the various embodiments, if the NMC observes a client sending additional requests before getting responses to previous request, it may be an indication that the client is malicious.

Also, in one or more of the various embodiments, NMCs may be arranged to evaluate the proportion of requests that require or expect servers to perform expensive resource consuming operations. Herein such requests may be referred to as heavy requests. While in some embodiments, clients may be expected to send a certain amount of heavy requests, a NMC may be configured to identify clients that send an abnormal amount of heavy requests.

In one or more of the various embodiments, there may be many different types of heavy requests, that depending on the application or protocols being used an network environment. For example, in some embodiments, heavy requests may include database queries that return entire tables of data, or other queries that perform many table joins absent, and so on. Likewise, in one or more of the various embodiments, heavy requests may be requests that may trigger long running operations like report generation. Further, in one or more of the various embodiments, heavy requests may include requests made to dynamic web pages rather than static web pages, or the like.

In one or more of the various embodiments, heavy request may also be identified as requests that attempt to circumvent caching or other types of optimizations that a server or application may be employing.

Generalized Operations

FIGS. 6-12 represent generalized operations for detection of denial of service attacks in accordance with one or more of the various embodiments. In one or more of the various embodiments, processes 600, 700, 800, 900, 1000, 1100, and 1200 described in conjunction with FIGS. 6-12 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment, containers (e.g., containerized services), or the like. However, embodiments are not so limited and various combinations of network computers, client computers, or the like may be utilized. Further, in one or more of the various embodiments, the processes described in conjunction with FIGS. 6-12 may be used for detection of denial of service attacks in accordance with at least one of the various embodiments and/or architectures such as those described in conjunction with FIGS. 4-5. Further, in one or more of the various embodiments, some or all of the actions performed by processes 600, 700, 800, 900, 1000, 1100, and 1200 may be executed in part by network monitoring engine 322, or analysis engine 324 running on one or more processors of one or more network computers or NMCs.

Figure 6:
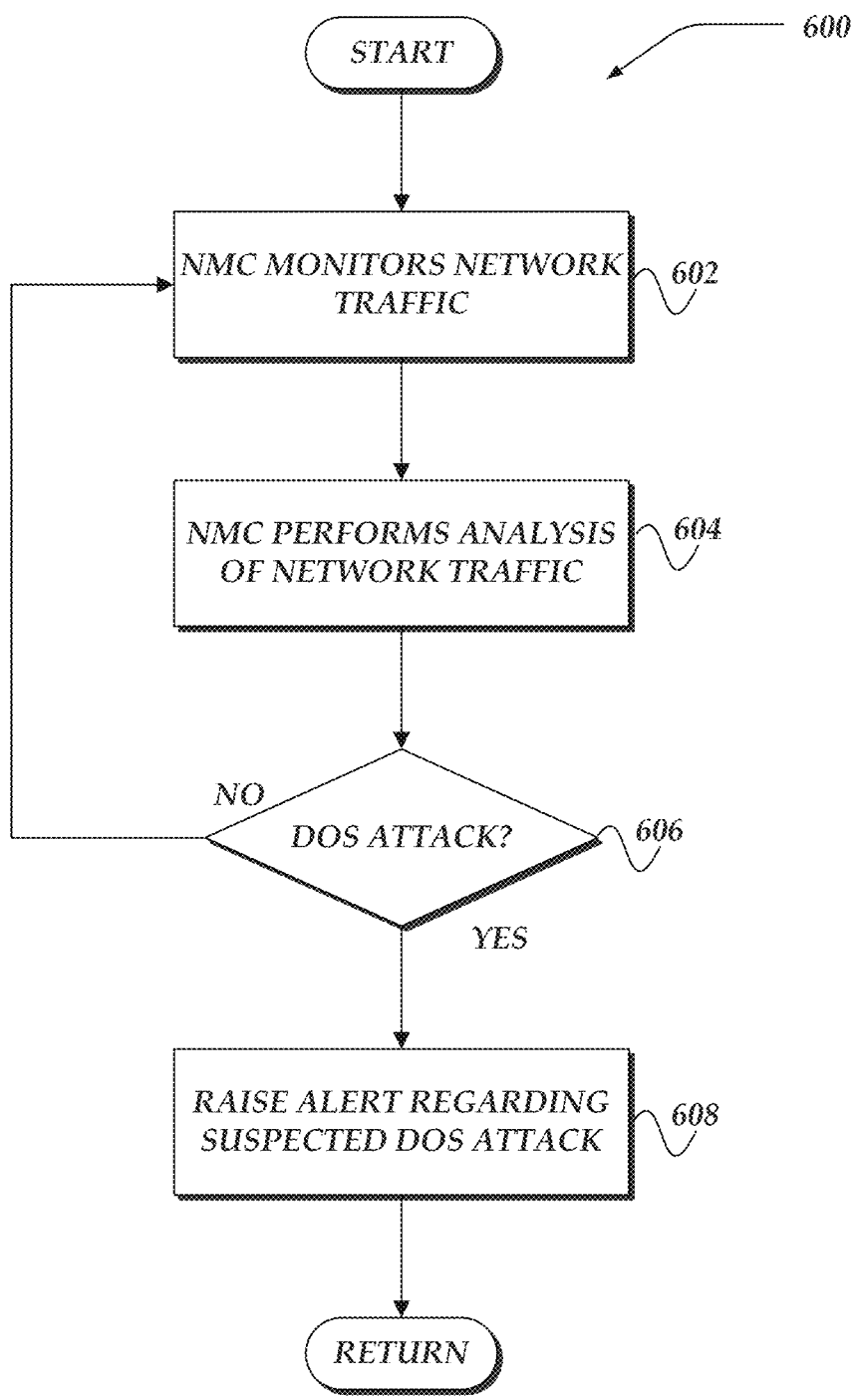
FIG. 6 illustrates an overview flowchart of a process for detection of denial of service attacks in accordance with one or more of the various embodiments.

FIG. 6 illustrates an overview flowchart of process 600 for detection of denial of service attacks in accordance with one or more of the various embodiments. After a start block, at block 602, in one or more of the various embodiments, one or more NMCs may be arranged to monitor network traffic. As described above, NMCs may be arranged to monitor network traffic that may be coming from one or more clients that may be trying to target one or more servers, services, applications, or the like, or combination thereof. In the interest of clarity and brevity the various targets that clients may be directing requests or other towards may be referred to simply as servers. Clearly, clients are not limited to targeting servers so one of ordinary skill in the art will appreciate that other targets, such as, applications, appliances, routers, firewalls, servers, services, name services, or the like, or combination thereof.

Further, in one or more of the various embodiments, NMCs may be arranged to collect various metrics related to the monitored network traffic, such as client transaction rate, server response rate, tuple information of observed network flows or network connections, or the like. Also, in one or more of the various embodiments, NMCs may monitor rates of changes, averages, totals, aggregate values, or the like. Further, in some embodiments, NMCs may be arranged to perform deep packet inspection of some or all packets sent by clients or servers. In some embodiments, NMCs may be arranged to monitor network traffic in the different OSI layers rather than being limited to monitoring OSI layer 7 (e.g., application layer).

Also, in one or more of the various embodiments, NMCs may be arranged to monitor client request traffic and server response traffic. Accordingly, in some embodiments, NMCs may correlate network traffic that is associated with client requests with network traffic that may be associated with server responses. For example, an NMC may observe the tuple information for inbound packets and tuple information for outbound packets (e.g., server responses). Thus, in one or more of the various embodiments, the NMCs may be arranged to employ the tuple information to correlate inbound or outbound traffic. For example, inbound network traffic may have, among other things, a source network address and a destination address while correlated outbound traffic may have a destination network address the matches the inbound traffic's source network address, and so on. Accordingly, for example, {inbound: Src=A, Dst=B; outbound: Src=B, Dst=A} may be the normal flow. Whereas a malformed flow for spoofed traffic might point the outbound Dst=B; or to a victim's address, to a fake unreachable address, or the like.

At block 604, in one or more of the various embodiments, the one or more NMCs may be arranged to perform analysis of network traffic. In one or more of the various embodiments, NMCs may be arranged to perform one or more actions to analyze client or server network traffic based on the metrics collected via the ongoing monitoring. In some embodiments, NMCs may be arranged to execute rules, programs, instructions, or the like, to perform one or more analysis actions, such as, comparisons against historical measurements, trend analysis, or the like.

In one or more of the various embodiments, the one or more NMCs may be arranged to execute one or more instructions, rules, or the like. In one or more of the various embodiments, may define one or more thresholds, conditions, or the like, that may be indicative of a possible DOS attack. In one or more of the various embodiments, the condition or thresholds of various metrics that are considered to be associated with a DOS attack may depend on an organization's sensitivity, risk profile, risk management policies, or the like. Accordingly, in one or more of the various embodiments, NMCs may be arranged to provide various pre-defined rules or conditions that an organization may activate or apply as desired to detect DOS attacks. Also, in one or more of the various embodiments, NMCs may be arranged to enable organizations to provide customized rules, policies, conditions, or threshold values, or the like, that may be directed to their DOS attack concerns. Likewise, in one or more of the various embodiments, as various kinds of DOS attacks evolve, one or more rules, policies, conditions, or threshold values, or the like, may be modified to identify new or different DOS attacks.

In one or more of the various embodiments, NMCs may be arranged to apply multiple rules or conditions, that may be assigned scores or weights, such that if one or more rules, policies, conditions, or threshold values, or the like, are activated, the scores may be accumulated. Accordingly, in one or more of the various embodiments, if a combined score of one or more results exceed a defined threshold, the NMC may determine that DOS attack may be in process.

At decision block 606, in one or more of the various embodiments, if denial of service attack is detected, control may flow to block 608; otherwise, control loop back to block 602. As described above, in one or more of the various embodiments, the one or more NMCs may be arranged to execute one or more rules, policies, conditions, or threshold values, or the like, to identify if a DOS attack is occurring.

At block 608, in one or more of the various embodiments, the one or more NMCs may be arranged to raise one or more alerts regarding the suspected DOS attack. In one or more of the various embodiments, NMCs may be arranged provide various alerting options that may be configured to execute if DOS attacks are detected. In some embodiments, the NMCs may be arranged to distinguish between different DOS attacks. Accordingly, in one or more of the various embodiments, different types of DOS attacks may be associated with different alerts or alert methods.

In some embodiments, NMCs may be arranged to employ one or more external APIs' or interfaces to provide or trigger alerts to one or more external services. Likewise, in some embodiments, NMCs may be arranged to provide one or more metrics to one or more external services to enable the external services to determine if alerts should be raised.

In one or more of the various embodiments, external services (including other NMCs or other NMCs components or engines) may be reached using published or otherwise well-known REST APIs over HTTP, message queues, sockets, or the like, or combination thereof.

Next, control may be returned to a calling process.

Figure 7:
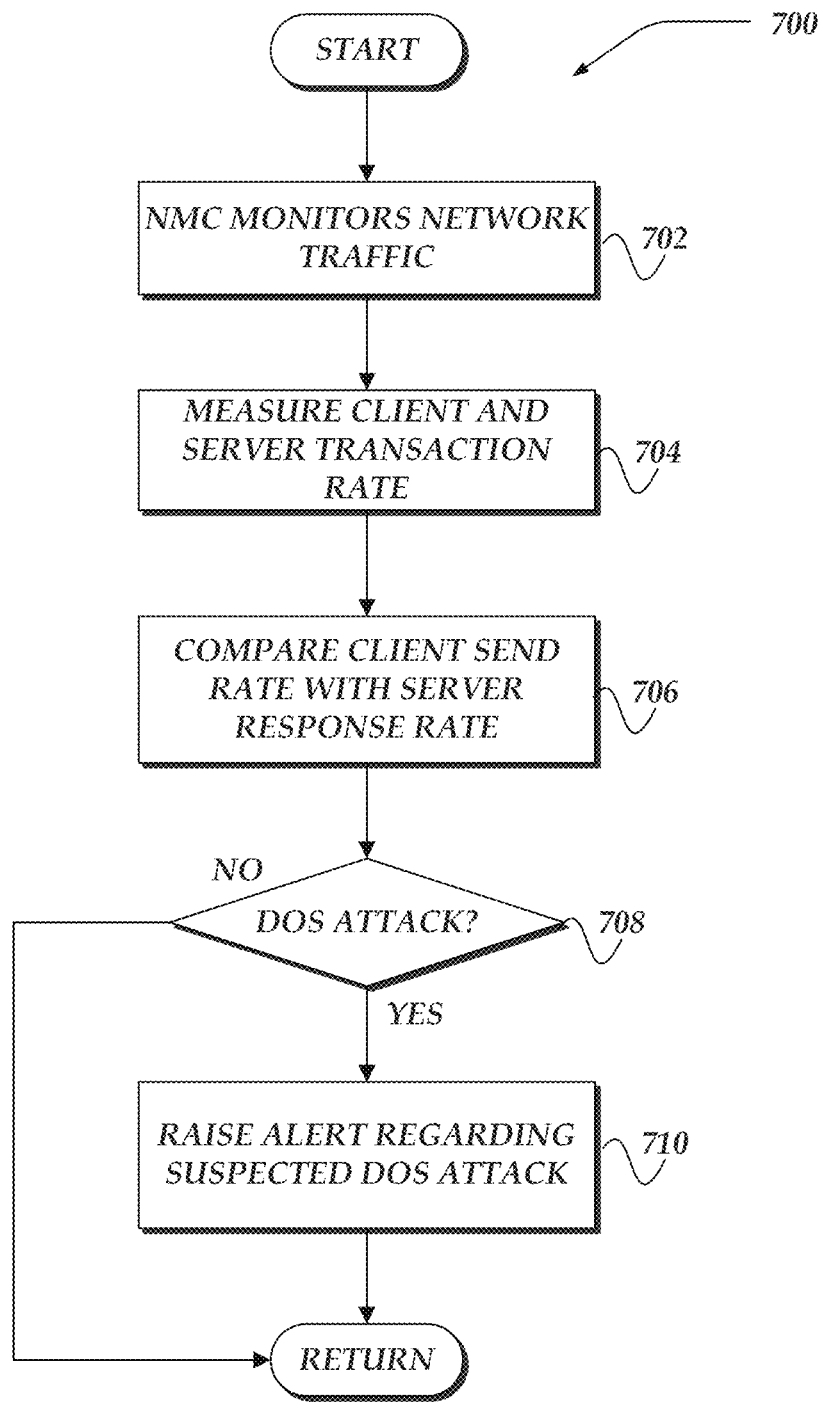
FIG. 7 illustrates a flowchart of a process for detection of denial of service attacks in accordance with one or more of the various embodiments.

FIG. 7 illustrates a flowchart of process 700 for detection of denial of service attacks in accordance with one or more of the various embodiments. After a start block, at block 702, in one or more of the various embodiments, one or more NMCs may be arranged to monitor network traffic. (See, the description of block 602, or the like.)

At block 704, in one or more of the various embodiments, the one or more NMCs may be arranged to measure the transaction rate for one or more clients and one or more servers. In one or more of the various embodiments, NMCs may be arranged to detect requests that are sent from the same client. Accordingly, in one or more of the various embodiments, the NMCs may monitor various metrics to obtain a transaction rate associated with the rate that clients send requests to a server as well as various metrics associated with the time it takes for the server to respond. In one or more of the various embodiments, transaction rates may be measured or monitored for network flows, network connections, clients, servers, application, services, or the like.

At block 706, in one or more of the various embodiments, the one or more NMCs may be arranged to compare transaction rates to one or more defined conditions, rules, threshold values, or the like. For example, in one or more of the various embodiments, NMCs may be arranged to measure how client request rates vary with respect to server response rates. One or more tests may be executed by the NMCs to determine if clients slow their request rate as servers slow their response rate. In normal circumstances, well-behaved clients may be expected to slow their request send rate as the response rate of target servers slows.

In one or more of the various embodiments, clients that continue to send requests at a high rate or constant rate in the face of slowing server response time may be considered potential DOS attackers. DOS attackers are likely to ignore server responses in general and continue to send a flood of requests at a high send-rate. Well-behaving clients may be expected to reduce their request rate because they may wait for server responses before sending additional requests. Or, in some embodiments, well-behaved clients may be expected to back-off or reduce their request rate when they determine that server response times are increasing.

Also, in one or more of the various embodiments, NMCs may be arranged to correlate specific client requests with specific server responses. For example, NMCs may correlate request-response pairs based on source-destination information (e.g., tuple information), sequence numbers, tags, tokens, or the like, included in the exchanged network traffic. Accordingly, in one or more of the various embodiments, NMCs may track if a client sends additional requests before receiving a response to previously sent requests. Such behavior may be indicative that a client is malicious.

Further, in one or more of the various embodiments, NMCs may be arranged to employ application or protocol specific tests that consider various features or patterns of various applications protocols or transport protocols. For example, if the client is trying to load an HTML web page, it is not unexpected that the client may send multiple requests around the same time to request resources for the web page, such as, scripts, images, style sheets, or the like, rather than sending such requests one at a time or otherwise waiting for a server to complete its response. In contrast, for example, if clients are observed sending multiple database query requests to a database before receiving corresponding server responses, those clients may be considered atypical, misbehaving, or suspicious.

Likewise, in one or more of the various embodiments, clients observed sending requests that begin protocol handshakes but then ignore corresponding server responses may be considered potential DOS attackers.

In some embodiments, NMCs may be arranged to observe or measure one or more metrics associated with the latency of client requests. For example, in some embodiments, if many malicious hosts may be sending small portions of HTTP request headers very slowly, to the target web server causing the web server (by design) to wait for all the header chunks to arrive. Accordingly, this type of attack might result in many concurrent connections to the target server that could result in the starvation (e.g., denial of service) of legitimate requests.

In some embodiments, NMCs may be arranged to score clients based on their behavior over time. Thus, clients may be initially be given the benefit of the doubt until they accumulate a bad-behavior score that exceeds a defined threshold. Also, the various suspicious activities NMCs are watching for may be associated with harm or risk scores that may be set accordingly.

At decision block 708, in one or more of the various embodiments, if the one or more NMCs detect one or more clients that may be participating in a DOS attack, control may flow block 712; otherwise, control may be returned to a calling process. In one or more of the various embodiments, the one or more NMCs may be arranged to ignore or disregard one or more client trust indicators, such as, source network address reputation, or the like. Accordingly, in one or more of the various embodiments, the metrics collected during monitoring may be agnostically applied to identify or determine misbehaving or atypical applications. This enables NMCs to detect one or more "trusted" sources that may have been compromised.

At block 710, in one or more of the various embodiments, the one or more NMCs may be arranged to raise one or more alerts regarding the suspected DOS attack. See, the description in block 608 for more detail. Next, control may be returned to a calling process.

Figure 8:
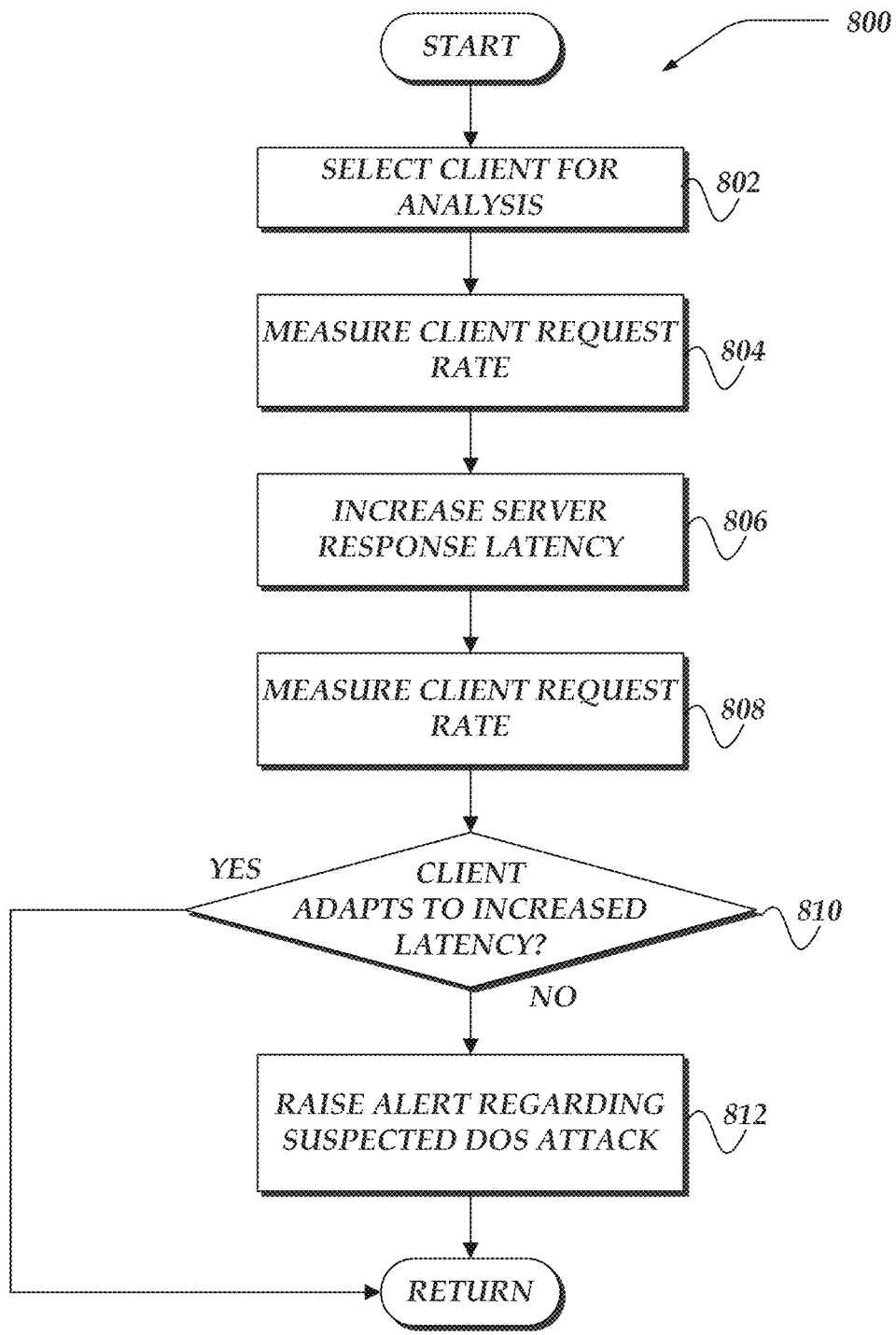
FIG. 8 illustrates a flowchart of a process for detection of denial of service attacks based on transaction rates in accordance with one or more of the various embodiments.

FIG. 8 illustrates a flowchart of process 800 for detection of denial of service attacks based on transaction rates in accordance with one or more of the various embodiments. After a start block, at block 802, in one or more of the various embodiments, one or more NMCs may be arranged to select one or more clients for analysis. In one or more of the various embodiments, NMCs may execute tests or evaluations on individual clients or groups of clients to evaluate how their associated transaction rates adapt to various conditions. The clients may be selected based on various schemes, including, random selection, the application of one or more filters, employing one or more heuristics, or the like. Note, for clarity and brevity this example focuses on send rates. However, one of ordinary skill in the art will appreciate that other metrics or combination of metrics associated with transaction rates may be employed as well.

For example, in some embodiments, one or more clients that are detected as having higher than average request send rates may be selected by an NMC. Or, in some cases, clients sending requests to particular servers, or from some particular locations, may be selected. In general, in one or more of the various embodiments, filters that apply various pattern matching tests (e.g., regular expression) may be provided via configuration information or rules, that may be executed to select one or more clients based on their network traffic.

At block 804, in one or more of the various embodiments, the one or more NMCs may be arranged to measure client request rate. As described above, the NMCs may be arranged to collect one or more metrics based on the measurement of send rates of the selected clients. In one or more of the various embodiments, these metrics may be employed to establish a baseline that may be compared to subsequently collected metrics. Accordingly, in one or more of the various embodiments, one or more of the metrics may be associated with the individual clients or a class of clients. For example, the connections or flow information associated with the selected clients may be maintained in a connection or flow table that may be employed to associate the metrics with the selected clients.

At block 806, in one or more of the various embodiments, the one or more NMCs may be arranged to perform one or more actions that increase the server response latency. In one or more of the various embodiments, NMCs may be configured to determine the one or more servers that the selected clients may be targeting based on the network traffic communicated between.

In one or more of the various embodiments, the one or more NMCs may be arranged to modify one or more characteristics of the network communication between the server and client to introduce latency or delay that increases the apparent response time of the one or more servers (e.g., transaction rate). In some embodiments, some or all the modifications may be arranged such that the servers are unaware of the modifications. Also, in one or more of the various embodiments, NMCs may be arranged to modify the network characteristics such that the selected clients may be impacted while the remainder of the clients may be unaffected.

Accordingly, in one or more of the various embodiments, NMCs may be arranged to execute instructions to modify the network paths between the selected clients and the servers. NMCs may be arranged to issue commands to routers or routing services to generate temporary routing paths through the network that may inject delays.

In some embodiments, NMCs may be arranged to re-write network packets of the selected clients to change their routes though the network. Also, in some embodiments, NMCs may be arranged to modify the network traffic of the selected clients to direct them buffers that may capture the traffic to introduce delay.

At block 808, in one or more of the various embodiments, the one or more NMCs may be arranged to again measure client request rate. Accordingly, the one or more NMCs may monitor if the selected clients back-off or otherwise respond to the delayed responses. As mentioned above, well-behaved clients may be expected to reduce their request send rate as server response rate is reduced by the synthetic delays.

At decision block 810, in one or more of the various embodiments, if the one or more selected clients may be observed to be adapting to the changes in server response latency, control may be returned to a calling process; otherwise, control may flow to block 812. Clients that may be observed reducing their request in response to the introduced delay that slows the server response time may be considered well-behaving clients while those that do not adapt to the introduced delay may be considered potentially malicious.

At block 812, in one or more of the various embodiments, the one or more NMCs may be arranged to raise one or more alerts regarding the suspected DOS attack. See, block 608 for a more detailed description.

Next, control may be returned to a calling process.

Figure 9:
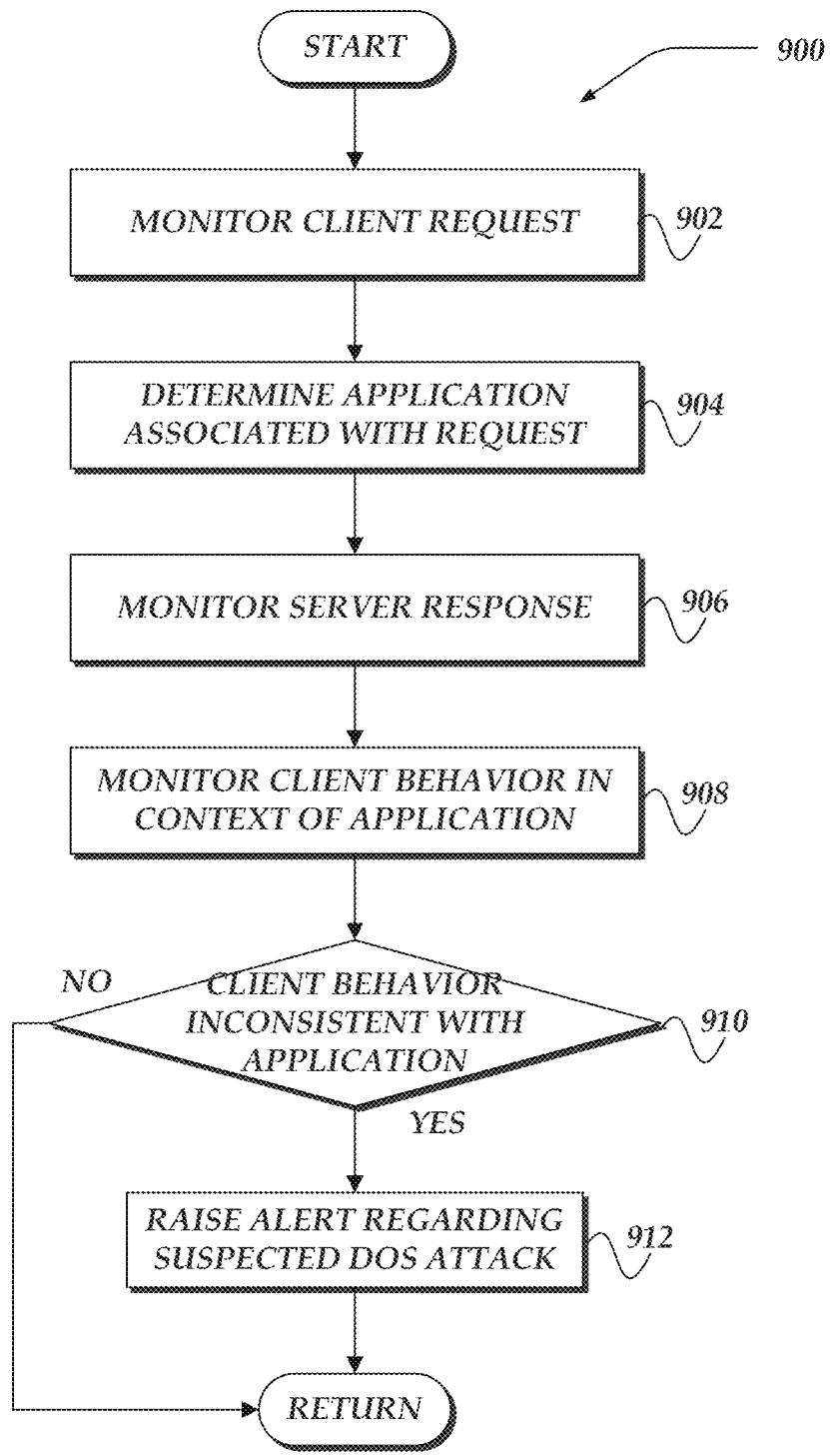
FIG. 9 illustrates a flowchart of a process for detection of denial of service attacks based on client behavior in the context of applications in accordance with one or more of the various embodiments.

FIG. 9 illustrates a flowchart of process 900 for detection of denial of service attacks based on client behavior in the context of applications in accordance with one or more of the various embodiments. After a start block, at block 902, in one or more of the various embodiments, the one or more NMCs may be arranged to monitor client requests. See, block 602 for a more detailed description of monitoring. Further, in some embodiments, the NMCs may be arranged to select one or more clients or groups of clients based on one or more or random selection, filters, heuristics, or the like, or combination thereof.

At block 904, in one or more of the various embodiments, the one or more NMCs may be arranged to determine the application that may be associated with the requests provided by a client. As mentioned above, NMCs may be equipped with application profiles that enable various application protocols to be identified. Also, in one or more of the various embodiments, NMCs may be configured to identify additional applications or application protocols that may be encountered in the network traffic. For example, NMCs may be arranged to dynamic execute configuration information that include profiles or patterns (e.g., regular expressions) customized to match or otherwise identify additional application protocols based on inspection of monitored network traffic associated with client requests or server responses.

Note, in some embodiments, the NMC may determine clients for application monitoring based on observed network traffic that is associated with applications of interest rather than selecting the clients beforehand. For example, an NMC may be configured passively monitor the network for database traffic. From that traffic, if any, the NMC may determine one or more clients to select for further application behavior monitoring.

At block 906, in one or more of the various embodiments, the one or more NMCs may be arranged to monitor the network traffic associated with one or more server responses. Accordingly, in one or more of the various embodiments, the NMCs may correlate client requests and server responses with one or more application protocols.

At block 908, in one or more of the various embodiments, the one or more NMCs may be arranged monitor client behavior in the context of the application. In one or more of the various embodiments, the one or more NMCs may be arranged to execute various tests, heuristics, pattern matching, state machines, or the like, to monitor whether clients perform actions that are consistent with applications or application protocols associated with the client requests and server responses.

In one or more of the various embodiments, some applications may include client-side feedback, monitoring, or the like, that may provide the NMC information regarding user interactions with the client-side of the application. For example, in some embodiments, web applications or web pages may include client-side scripts (e.g., JavaScript, or the like) that track or report user interactions with the user-interface of the application at the client. Also, for example, in one or more of the various embodiments, a client application may display one or more user-interface components that require scrolling to view, expected dwell-times (e.g., time for users to read client-side content), buttons to click, or the like. Accordingly, if a client sends client requests before a user has appropriately or expectedly interacted with the client application, it may indicate to the NMC that the client is malicious and may be a DOS attacker.

Likewise, in some embodiments, an application may have inherent features that proscribe how well-behaved users are expected to act. For example, in one or more of the various embodiments, if a web page or web application presented to a client includes form fields, the NMC may be arranged to expect well-behaved client requests to submit values for the form fields. In one or more of the various embodiments, NMCs may passively monitor the content of server responses to identify if the response includes buttons, form fields, or the like. Also, in some embodiments, the NMC may passively monitor associated or correlated client requests to confirm if the client is realistically interacting with the server responses. For example, clients that make client requests for the resources without following up with requests that use or interact with the resources (e.g., web forms) provided by the server may be considered malicious or potential DOS attackers.

Also, in one or more of the various embodiments, client-side monitoring may report if clients send additional or unexpected requests before their web agent (e.g., web browser) has finished rendering or loading the HTML associated with the web page. Note, in some embodiments, some applications or application protocols may expect clients to send more than one request before previous server responses are fully-rendered at the client application. Accordingly, NMCs may be configured to identify such applications and their qualifying client requests as well-behaved rather than considering them malicious.

Further, in some embodiments, NMCs may assign threat or risk scores to clients based on their observed behavior. Different behaviors or behavior patterns may be assigned threat values or risk values. Accordingly, one or more threshold values may be defined that, if exceeded, may indicate a client may be malicious. In some embodiments, a client's score may be arranged to decay (e.g., reduce over a defined time period) if a client avoids being assigned threat or risk scores for a defined time period.

At decision block 910, in one or more of the various embodiments, if client behavior is determined to be inconsistent with the application, control may flow to block 912; otherwise, control may be returned to a calling process.

At block 912, in one or more of the various embodiments, the one or more NMCs may be arranged to raise one or more alerts regarding the suspected DOS attack. See, block 608 for a more detailed description. Next, control may be returned to a calling process.

Figure 10:
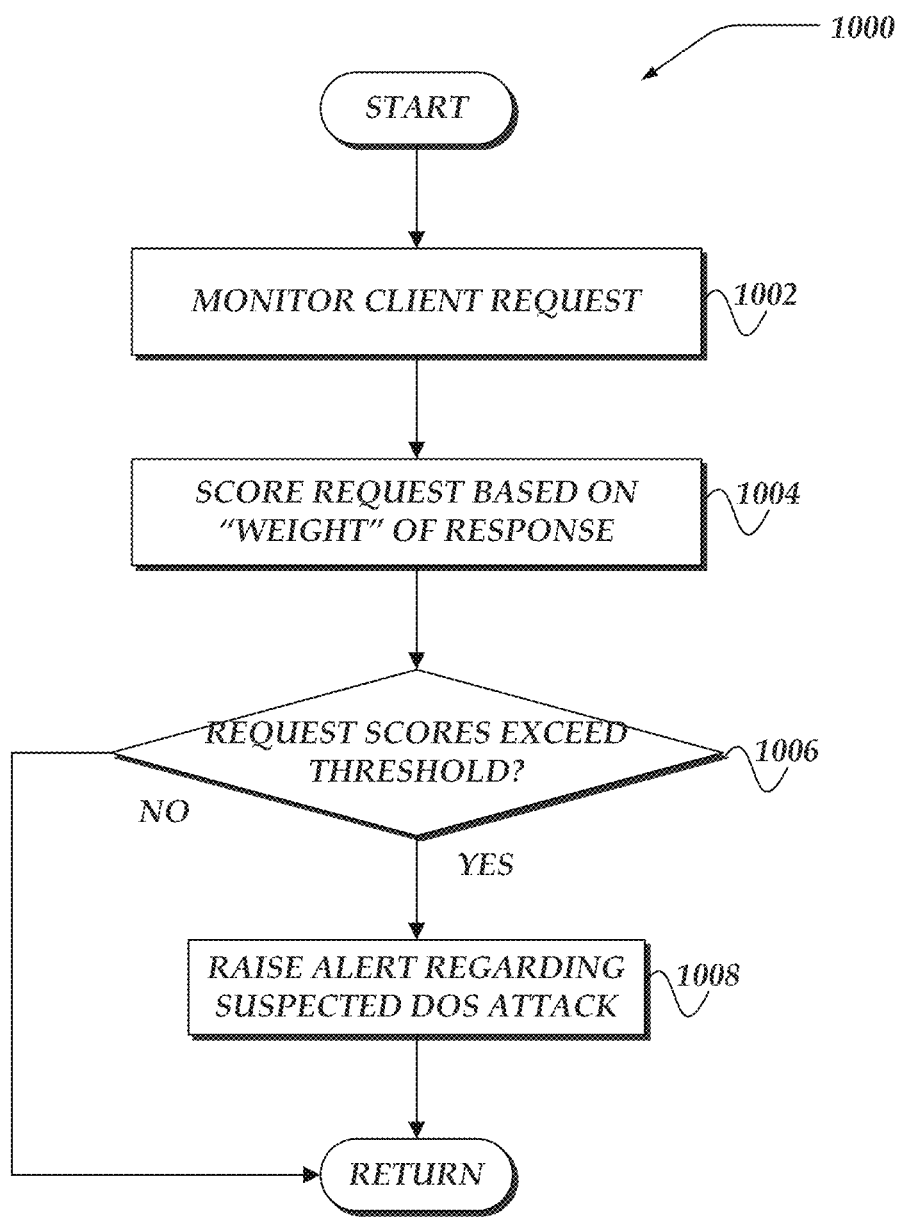
FIG. 10 illustrates a flowchart of a process for detection of denial of service attacks based on client request weight characteristics in accordance with one or more of the various embodiments.

FIG. 10 illustrates a flowchart of process 1000 for detection of denial of service attacks based on client request weight characteristics in accordance with one or more of the various embodiments. After a start block, at block 1002, in one or more of the various embodiments, the one or more NMCs may be arranged to monitor client requests. See, above for additional detailed descriptions of client monitoring by NMCs.

At block 1004, in one or more of the various embodiments, the one or more NMCs may be arranged to score the requests sent by the clients based on a weight of the response the corresponds to a request. As described above, NMCs may be arranged to associate risk or threat scores with observed behavior or suspicious network traffic.

Also, in one or more of the various embodiments, one or more NMCs may be arranged to compare the data size or performance impact of client requests or server responses. The data size or performance impact associated with a client request may be correlated to weight values. Accordingly, in some embodiments, a large-sized or high performance request may be considered a heavy request.

Accordingly, in one or more of the various embodiments, NMCs may monitor the tendency for a given client to send heavy requests as compared to other clients. Clients that may be identified as sending a rate of heavy client requests that exceed a defined threshold may be considered potentially malicious.

In some embodiments, NMCs may establish base-line request weight values or thresholds based on monitoring all client requests for a given type of application, protocol, source, destination, or the like. Further, in some embodiments, clients for establishing request weight base-lines may be selected by sampling or random selection rather than measuring all clients or all client requests. Also, in some embodiments, client request weight base-line values may be set using configuration information, rule-based policies, user-input, or the like, or combination thereof.

At decision block 1006, in one or more of the various embodiments, if the request scores exceed one or more defined weight or weight average thresholds, control may flow to block 1008; otherwise, control may be returned to a calling process.

At block 1008, in one or more of the various embodiments, the one or more NMCs may be arranged to raise one or more alerts regarding suspected DOS attacks as described in more detail above. Next, control may be returned to a calling process.

Figure 11:
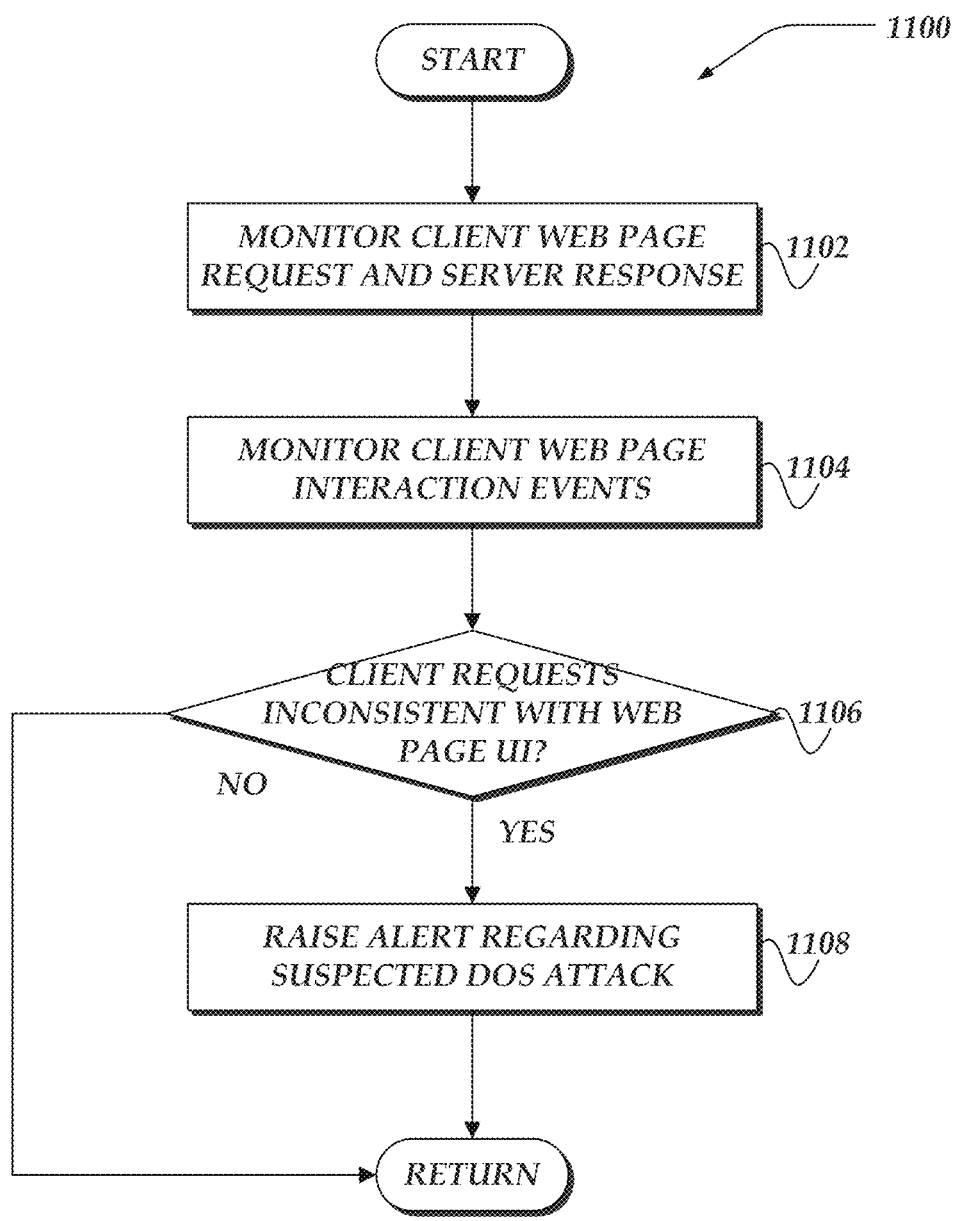
FIG. 11 illustrates a flowchart of a process for detection of denial of service attacks based on client interactions with web pages or web applications in accordance with one or more of the various embodiments.

FIG. 11 illustrates a flowchart of process 1100 for detection of denial of service attacks based on client interactions with web pages or web applications in accordance with one or more of the various embodiments. After a start block, at block 1102, in one or more of the various embodiments, the one or more NMCs may be arranged to monitor client web page or web application requests. As described above, NMCs may be arranged to identify particular applications or application protocols based on monitoring the network traffic associated with specific applications or application protocols. Accordingly, in one or more of the various embodiments, NMCs may be arranged to identify web protocols such as HTTP. In some embodiments, network traffic associated with HTTP may be identified based on a variety of factors or a combination of factors that are well-known to be associated with HTTP or HTTP-based applications such as web sites or web applications. For example, client requests that use the TCP/IP transport protocol, that may be directed to TCP port 80 may be considered HTTP traffic. Also, in some embodiments, NMCs may be pre-configured with records that identify one or more servers that support or offer HTTP based services. Further, in some embodiments, NMCs may be arranged to inspect network traffic to identify HTTP-like protocols the match one or more but not all characteristics common to the HTTP protocol. For example, HTTP traffic may be usually sent on TCP ports such as port 80, port 8080, port 8181, or the like. Accordingly, for example, NMCs may be arranged to detect HTTP sent over other ports. This may be accomplished by using one or more tests, heuristics, pattern matching, or the like, to identity common content or patterns commonly included in HTTP traffic, such as, HTTP commands (e.g., GET, POST, PUT, or the like), common HTTP header values, (e.g., user-agent, or the like), and so on.

Further, in additional to identifying HTTP traffic in general, NMCs may be arranged to identify HTML traffic associated with web pages or web applications. NMCs may be arranged to identify HTML based on monitoring server responses for common HTML content, such as, HTML markup strings (e.g., <html>, <form>, <script>, <a>, or the like).

Additionally, in one or more of the various embodiments, NMCs may include profile information that is arranged to match or identify one or more HTML constructs or idioms that correspond to expected interactions or actions on the part of the clients or users, such as, forms, user-interfaces controls (e.g., buttons, anchors/links, selection controls, or the like). Also, in some embodiments, NMCs may be arranged to identify HTML content that corresponds to higher-level or complex components such as media players, document viewers, date pickers, or the like.

In one or more of the various embodiments, NMCs may be arranged to identify one or more client-side frameworks or libraries, such as, jquery, react, or the like, that may embed interactive components or be used to create interactive components on a client-side web application.

At block 1104, in one or more of the various embodiments, the one or more NMCs may be arranged to monitor client interactions with the web page or web application. In one or more of the various embodiments, NMCs may be arranged to identify HTML or HTTP requests sent by clients as well as identify correlated server responses that may be sent in response to HTML or HTTP client requests.

Accordingly, in one or more of the various embodiments, NMCs may be arranged to monitor whether the client requests are consistent with the HTML or HTTP response sent by the servers.

Also, in one or more of the various embodiments, one or more NMCs may be arranged to include application profiles associated with expected multi-step interactions common to HTML applications. For example, if a server responds to a client request by providing the client an HTML page that includes fields for collection of user credentials, such as username and password fields, the NMC may anticipate that the subsequent client request may include a username and password. In this example, if the subsequent client request appears to be unrelated to user credentials, it may be indicative that client is atypical or misbehaving.

In one or more of the various embodiments, one or more NMCs may be configured to include one or more set-piece profiles for identifying a variety of common HTML scenarios. For example, credential requests, form fill requests, captcha forms, or the like.

Also, in one or more of the various embodiments, NMCs may be arranged to identify common HTTP transactions or HTML content patterns based on monitoring communication between well-behaving client or servers. Accordingly, in some embodiments, clients that make requests that deviate from expected or historical behavior of known HTML applications may be identified as atypical or misbehaving clients.

In one or more of the various embodiments, web pages provided to clients may include one or more instructions that send an expected request after the HTML page finishes loading, such as, client requests coded to be send in the onload page event. Accordingly, in some embodiments, NMCs may be arranged to observe if clients send client requests before the onload event fires. Also, as mentioned above, some web applications may be arranged to include client-side instrumentation that may send client requests that may inform servers of the operational state or status of the web applications. Accordingly, in one or more of the various embodiments, NMCs may be arranged to monitor such instrumented client requests and compare the operational state of the web application with the overall client request send rate, overall transaction rate, or the like.

At decision block 1106, in one or more of the various embodiments, if the client requests are inconsistent with the web page or web application, control may flow to block 1108; otherwise, control may be returned to a calling process.

At block 1108, in one or more of the various embodiments, the one or more NMCs may be arranged to raise one or more alerts regarding the suspected DOS attack as described in more detail above. Next, control may be returned to a calling process.

Figure 12:
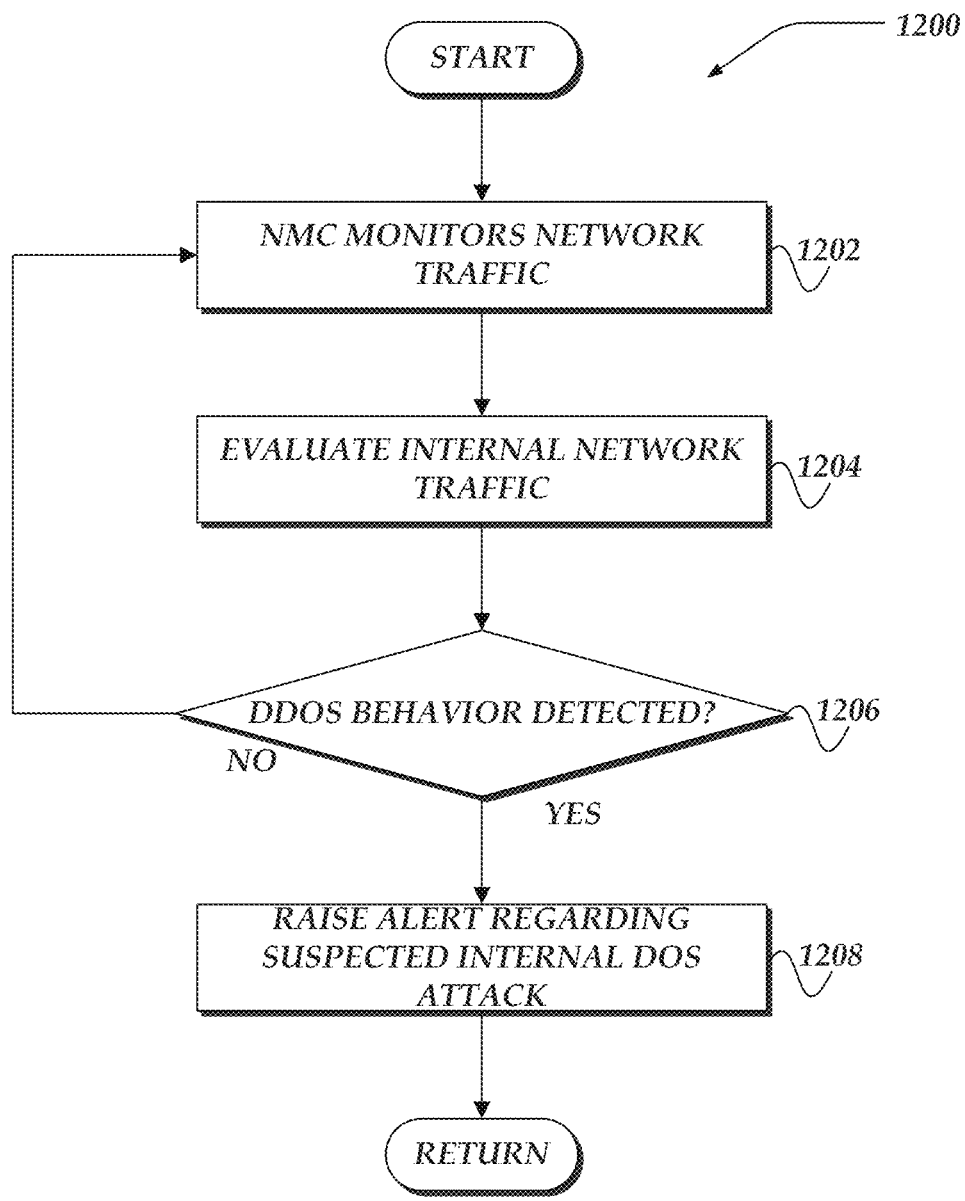
FIG. 12 illustrates a flowchart of a process for detection of denial of service attacks promulgated be clients inside the network in accordance with one or more of the various embodiments.

FIG. 12 illustrates a flowchart of process 1200 for detection of denial of service attacks promulgated be clients inside the network in accordance with one or more of the various embodiments. After a start block, at block 1202, in one or more of the various embodiments, the one or more NMCs may be arranged to monitor network traffic occurring inside one or more networks.

Many DOS detection services or appliances may be designed or optimized for identifying or protecting against DOS attacks that originate from outside so-called trusted networks. These types of services or devices provide a ring of defensives to protect internal networks from DOS attacks. However, in some cases, sophisticated attackers may employ compromised clients that are inside the trusted networks of an organization. Accordingly, in some case, traditional DOS attack detection or defenses may be ineffective or less effective on such internal attacks.

Accordingly, because NMCs may be arranged to monitor internal network traffic including traffic that occurs in so-called trust networks, they may be effectively employed to detect DOS attacks that may originate inside the trusted network environments.

At block 1204, in one or more of the various embodiments, the one or more NMCs may be arranged to evaluate the internal network traffic. As described above, NMCs may be arranged to monitor network traffic that occurs within a network or different parts of networks. Accordingly, in one or more of the various embodiments, NMCs may apply one or more of the above described mechanisms to identify clients (e.g., internal clients) that may be malicious DOS attackers.

At decision block 1206, in one or more of the various embodiments, if DOS behavior may be detected, control may flow to block 1208; otherwise, control may be returned to a calling process. Similar to mechanisms described above, NMCs may be arranged to detect clients that may be exhibiting behavior associated with DOS attacks.

At block 1208, in one or more of the various embodiments, the one or more NMCs may be arranged to raise one or more alerts regarding the suspected DOS attack as described in more detail above. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for monitoring network traffic using one or more network computers over one or more networks, wherein execution of instructions by the one or more networking computers perform the method comprising:
   comparing one or more request metrics for a plurality of requests to one or more previously determined request metrics to identify each client associated with at least one request metric that is non-equivalent to the one or more previously determined request metrics, wherein the identification is based on a high disparity in computational resources employed to provide responses correlated to one or more of the plurality of requests; and
   in response to determining atypical adaptation to one or more prearranged modifications by one or more identified clients, performing further actions including:
      providing a risk score for each identified client that provides atypical adaptation to the one or more prearranged modifications, wherein the risk score is increased based on an increase in an amount of atypical adaptation over time, and wherein the risk score is decreased based on a decrease in the amount of atypical adaptation over time; and
      providing a notification of the atypical adaptation to a user.

2. The method of claim 1, further comprising:
providing one or more prearranged modifications to at least a portion of a plurality of responses that are provided by one or more servers to at least a portion of the plurality of requests provided by each identified client.

3. The method of claim 1, further comprising:
monitoring internal network traffic within the one or more networks or a portion of a network to identify each internal client that is associated with one or more internal attacks.

4. The method of claim 1, further comprising:
monitoring network traffic that occurs inside a trusted network; and
collecting the one or more request metrics and one or more response metrics based on the network traffic that occurs inside the trusted network.

5. The method of claim 1, wherein the atypical adaptation, further comprises:
identifying the atypical adaptation as a denial of service (DOS) attack on the network.

6. The method of claim 1, further comprising:
providing client side instrumentation to one or more portions of the plurality of requests to compare one or more of an operational state or a status of one or more web pages to one or more of a client request rate or a transaction rate.

7. The method of claim 1, further comprising:
employing one or more regular expressions to identify one or more of an application or an application protocol that is associated with one or more portions of the plurality of requests.

8. A network monitoring computer (NMC) for monitoring network traffic, comprising:
a memory that stores at least instructions; and
one or more processors that execute instructions that perform actions, including:
comparing one or more request metrics for a plurality of requests to one or more previously determined request metrics to identify each client associated with at least one request metric that is non-equivalent to the one or more previously determined request metrics, wherein the identification is based on a high disparity in computational resources employed to provide responses correlated to one or more of the plurality of requests; and
in response to determining atypical adaptation to one or more prearranged modifications by one or more identified clients, performing further actions including:
providing a risk score for each identified client that provides atypical adaptation to the one or more prearranged modifications, wherein the risk score is increased based on an increase in an amount of atypical adaptation over time, and wherein the risk score is decreased based on a decrease in the amount of atypical adaptation over time; and
providing a notification of the atypical adaptation to a user.

9. The NMC of claim 8, further comprising:
providing one or more prearranged modifications to at least a portion of a plurality of responses that are provided by one or more servers to at least a portion of the plurality of requests provided by each identified client.

10. The NMC of claim 8, further comprising:
monitoring internal network traffic within the one or more networks or a portion of a network to identify each internal client that is associated with one or more internal attacks.

11. The NMC of claim 8, further comprising:
monitoring network traffic that occurs inside a trusted network; and
collecting the one or more request metrics and one or more response metrics based on the network traffic that occurs inside the trusted network.

12. The NMC of claim 8, wherein the atypical adaptation further comprises:
identifying the atypical adaptation as a denial of service (DOS) attack on the network.

13. The NMC of claim 8, further comprising:
providing client side instrumentation to one or more portions of the plurality of requests to compare one or more of an operational state or a status of one or more web pages to one or more of a client request rate or a transaction rate.

14. The NMC of claim 8, further comprising:
employing one or more regular expressions to identify one or more of an application or an application protocol that is associated with one or more portions of the plurality of requests.

15. A processor readable non-transitory storage media that includes instructions for monitoring network traffic using one or more network computers, wherein execution of the instructions by one or more networking computers perform actions, comprising:
comparing one or more request metrics for a plurality of requests to one or more previously determined request metrics to identify each client associated with at least one request metric that is non-equivalent to the one or more previously determined request metrics wherein the identification is based on a high disparity in computational resources employed to provide responses correlated to one or more of the plurality of requests; and
in response to determining atypical adaptation to one or more prearranged modifications by one or more identified clients, performing further actions including:
providing a risk score for each identified client that provides atypical adaptation to the one or more prearranged modifications, wherein the risk score is increased based on an increase in an amount of atypical adaptation over time, and wherein the risk score is decreased based on a decrease in the amount of atypical adaptation over time; and
providing a notification of the atypical adaptation to a user.

16. The processor readable non-transitory storage media of claim 15, further comprising:
providing one or more prearranged modifications to at least a portion of a plurality of responses that are provided by one or more servers to at least a portion of the plurality of requests provided by each identified client.

17. The processor readable non-transitory storage media of claim 15, further comprising:
monitoring internal network traffic within the one or more networks or a portion of a network to identify each internal client that is associated with one or more internal attacks.

18. The processor readable non-transitory storage media of claim 15, further comprising:

monitoring network traffic that occurs inside a trusted network; and collecting the one or more request metrics and one or more response metrics based on the network traffic that occurs inside the trusted network.

19. The processor readable non-transitory storage media of claim 15, further comprises:

identifying the atypical adaptation as a denial of service (DOS) attack on the network.

20. The processor readable non-transitory storage media of claim 15, further comprising:

providing client side instrumentation to one or more portions of the plurality of requests to compare one or more of an operational state or a status of one or more web pages to one or more of a client request rate or a transaction rate.

\* \* \* \* \*